United States Patent [19]

Briggs et al.

[11] Patent Number: 5,076,656
[45] Date of Patent: Dec. 31, 1991

[54] HIGH PRECISION OPTICAL FIBER CONNECTORS

[76] Inventors: Robert C. Briggs, 342 N. 4th St., Newport, Pa. 17074; Lloyd R. Budd, 2214 Forster St., Harrisburg, Pa. 17103; John C. Hoffer, 507 N. 36th St., Harrisburg, Pa. 17109; William J. Stape, 2111 Bellevue Rd., Harrisburg, Pa. 17104; Donald W. Thompson, 7 Bayberry Dr., Mechanicsburg, Pa. 17055; Robert N. Weber, 29 S. Railroad St., Hummelstown, Pa. 17036

[21] Appl. No.: 439,206

[22] Filed: Nov. 17, 1989

Related U.S. Application Data

[63] Continuation-in-part of Ser. No. 734,831, May 17, 1985, abandoned, which is a continuation-in-part of Ser. No. 618,851, Jun. 8, 1984, Pat. No. 4,687,291, and a continuation-in-part of Ser. No. 236,103, Aug. 23, 1988, abandoned, and a continuation-in-part of Ser. No. 287,921, Dec. 21, 1988, abandoned, which is a continuation-in-part of Ser. No. 734,831, May 17, 1985, abandoned, and a continuation-in-part of Ser. No. 112,188, Oct. 26, 1987, abandoned, and a continuation-in-part of Ser. No. 185,756, Apr. 25, 1988, abandoned, which is a continuation-in-part of Ser. No. 112,188, Oct. 26, 1987, abandoned, and a continuation-in-part of Ser. No. 328,259, Mar. 23, 1989, abandoned.

[51] Int. Cl.$^5$ ................................ G02B 6/38
[52] U.S. Cl. ........................ 385/71; 385/60
[58] Field of Search ............... 350/96.2, 96.21, 96.22

[56] References Cited

U.S. PATENT DOCUMENTS

| | | | |
|---|---|---|---|
| 3,032,737 | 5/1962 | Rottmann | 439/446 |
| 3,271,725 | 9/1966 | Bloch | 439/141 |
| 3,474,395 | 10/1969 | Ferdon et al. | 439/633 |
| 3,518,620 | 4/1968 | Bushey et al. | 439/633 |
| 3,575,684 | 4/1971 | McIntyre | 439/140 |
| 3,638,013 | 1/1972 | Keller | 433/31 |
| 3,754,205 | 8/1973 | Lenkey | 439/141 |

(List continued on next page.)

FOREIGN PATENT DOCUMENTS

| | | |
|---|---|---|
| 0022000 | 1/1981 | European Pat. Off. |
| 0137665 | 4/1985 | European Pat. Off. |
| 8600147 | 1/1986 | PCT Int'l Appl. |
| 2069175 | 8/1981 | United Kingdom |

OTHER PUBLICATIONS

Young et al., "Transfer-Molded Biconic Connector with Insertion Losses Below 0.3 dB with Index Match", Sixth European Conference on Optical Communication, York, England (16–19, Sep. 1980), pp. 310–313.

Primary Examiner—John D. Lee
Assistant Examiner—John Ngo

[57] ABSTRACT

A duplex fiber optic connector assembly enables mating the fibers of a first multifiber cable with like fibers of a second cable or cables with maximum axial alignment of the respective fiber paris. An interconnect member receives cable terminating connectors in opposite sides thereof. Each connector carries the fibers of a respective cable in individual ferrules, each ferrule having limited floating mount within the respective connector. The mating pairs of ferrules are received in opposite ends of receptor members each of which has an axially profiled bore adapted to receive the respective ferrules and a profiled outer surface which allows movement about the geometric center of the receptor so as to axially align the bores of the ferrules received therein. Connectors at each end of a predetermined length of fiber optic cable provide a fiber optic extension cord, analogous to the well-known electrical extension cord, for convenient and efficient interconnection between optical signal-using equipments. Small interconnect members receive the connectors of such fiber optic extension cords to allow even wider-ranging interconnections. Wall boxes containing such interconnect members, connected to permanently installed fiber optic cables conveying optical signals from a central optical signal source, allow a user to readily access optical signals by "plugging-in" a connector therein.

24 Claims, 29 Drawing Sheets

U.S. PATENT DOCUMENTS

| | | | |
|---|---|---|---|
| 3,897,134 | 7/1975 | Scrivo et al. | 350/96.22 |
| 4,167,303 | 9/1979 | Bowen et al. | 350/96.21 |
| 4,203,004 | 5/1980 | Cox | 174/135 |
| 4,233,724 | 11/1980 | Bowen et al. | 29/428 |
| 4,245,887 | 1/1981 | Johnson | 350/96.21 |
| 4,339,165 | 7/1982 | Malsot et al. | 439/139 |
| 4,340,267 | 7/1982 | Nukaga | 439/141 |
| 4,376,565 | 3/1983 | Bird et al. | 439/681 |
| 4,418,983 | 12/1983 | Bowen et al. | 350/96.21 |
| 4,445,739 | 5/1984 | Wooten | 339/140 |
| 4,448,467 | 5/1984 | Weidler | 439/80 |
| 4,449,767 | 5/1984 | Weidler | 439/64 |
| 4,515,434 | 5/1985 | Margolin et al. | 350/96.21 |
| 4,557,542 | 12/1985 | Coller et al. | 439/595 |
| 4,580,868 | 4/1986 | Verstijnen | 439/680 |
| 4,611,887 | 9/1986 | Glover et al. | 350/96.21 |
| 4,673,242 | 6/1987 | Logan et al. | 350/96.2 |
| 4,678,264 | 7/1987 | Bowen et al. | 350/96.2 |
| 4,712,816 | 12/1987 | Lukas et al. | 350/96.21 |
| 4,715,675 | 12/1987 | Kevern et al. | 350/96.2 |
| 4,733,936 | 3/1988 | Mikolaicyk et al. | 350/96.21 |
| 4,762,388 | 8/1988 | Tanaka et al. | 350/96.2 |
| 4,779,952 | 10/1988 | Hayashi et al. | 350/96.21 |

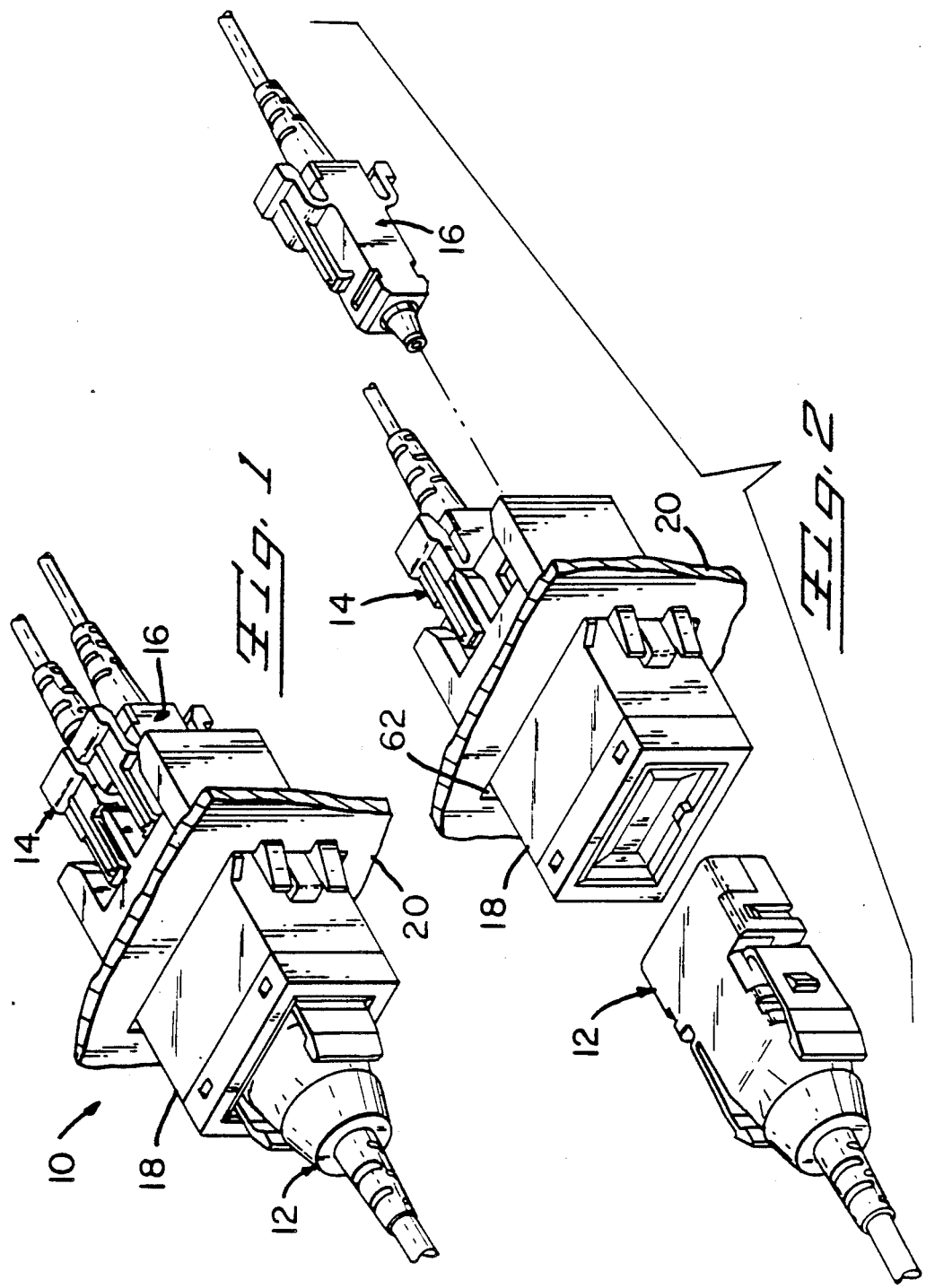

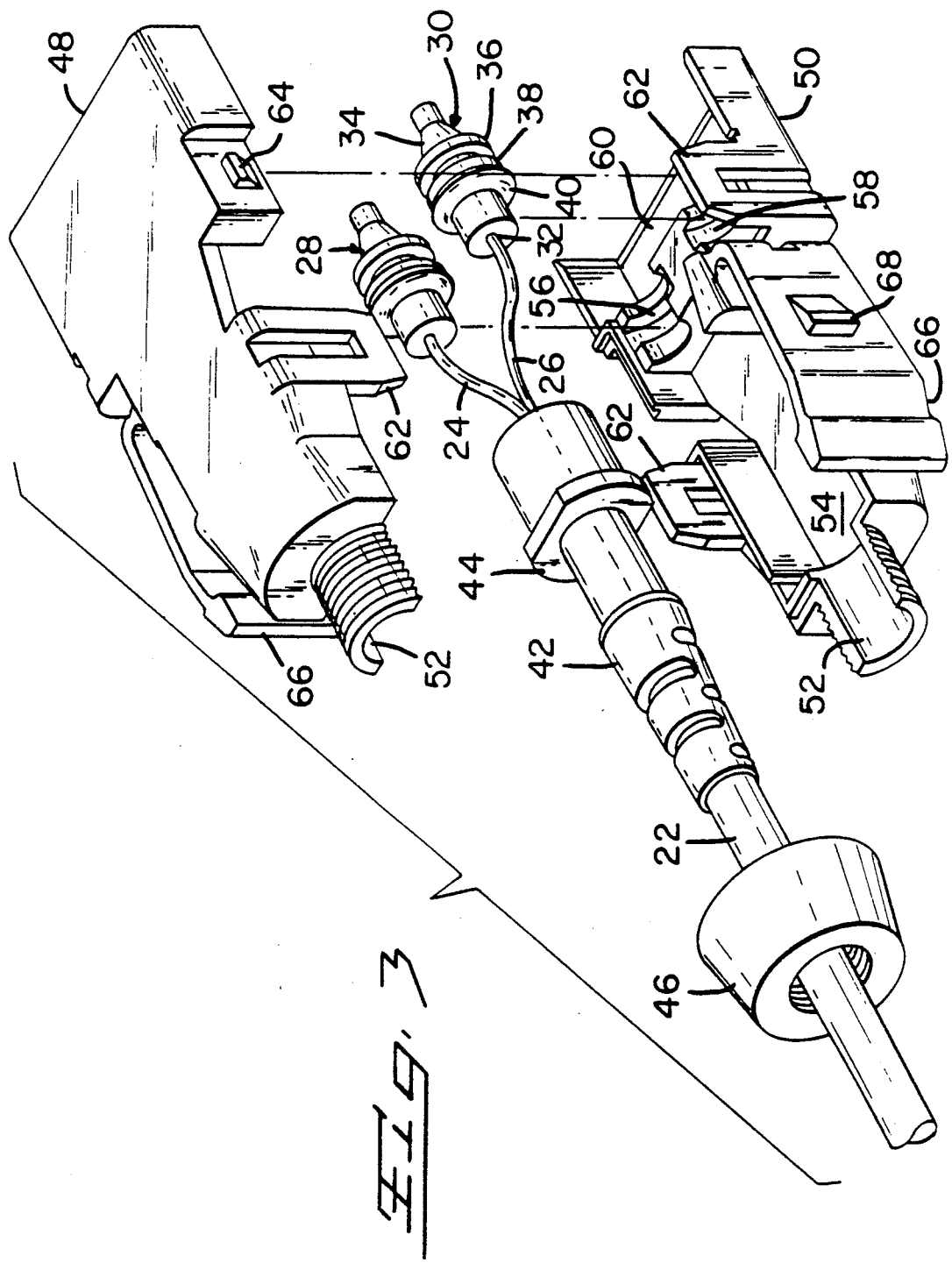

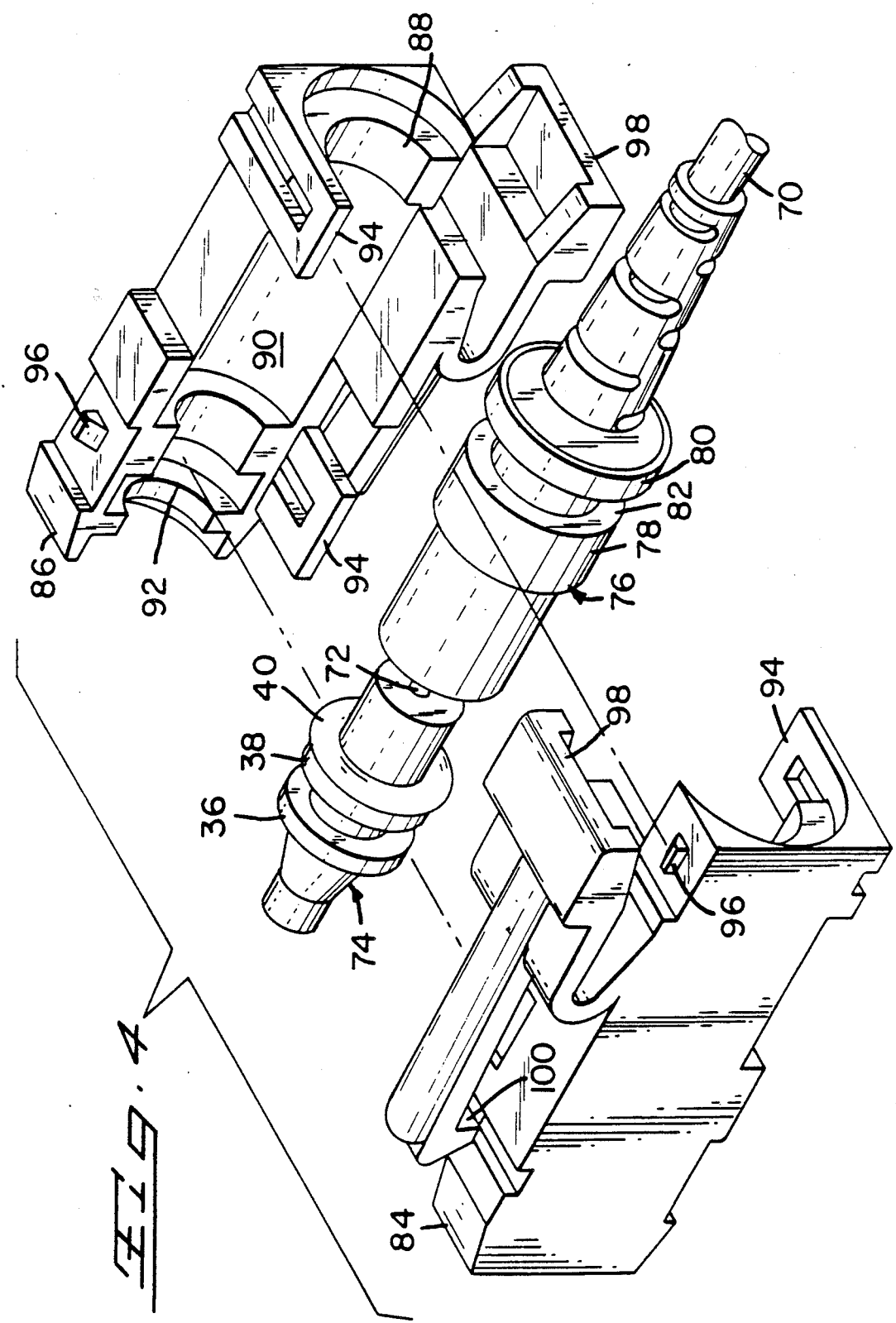

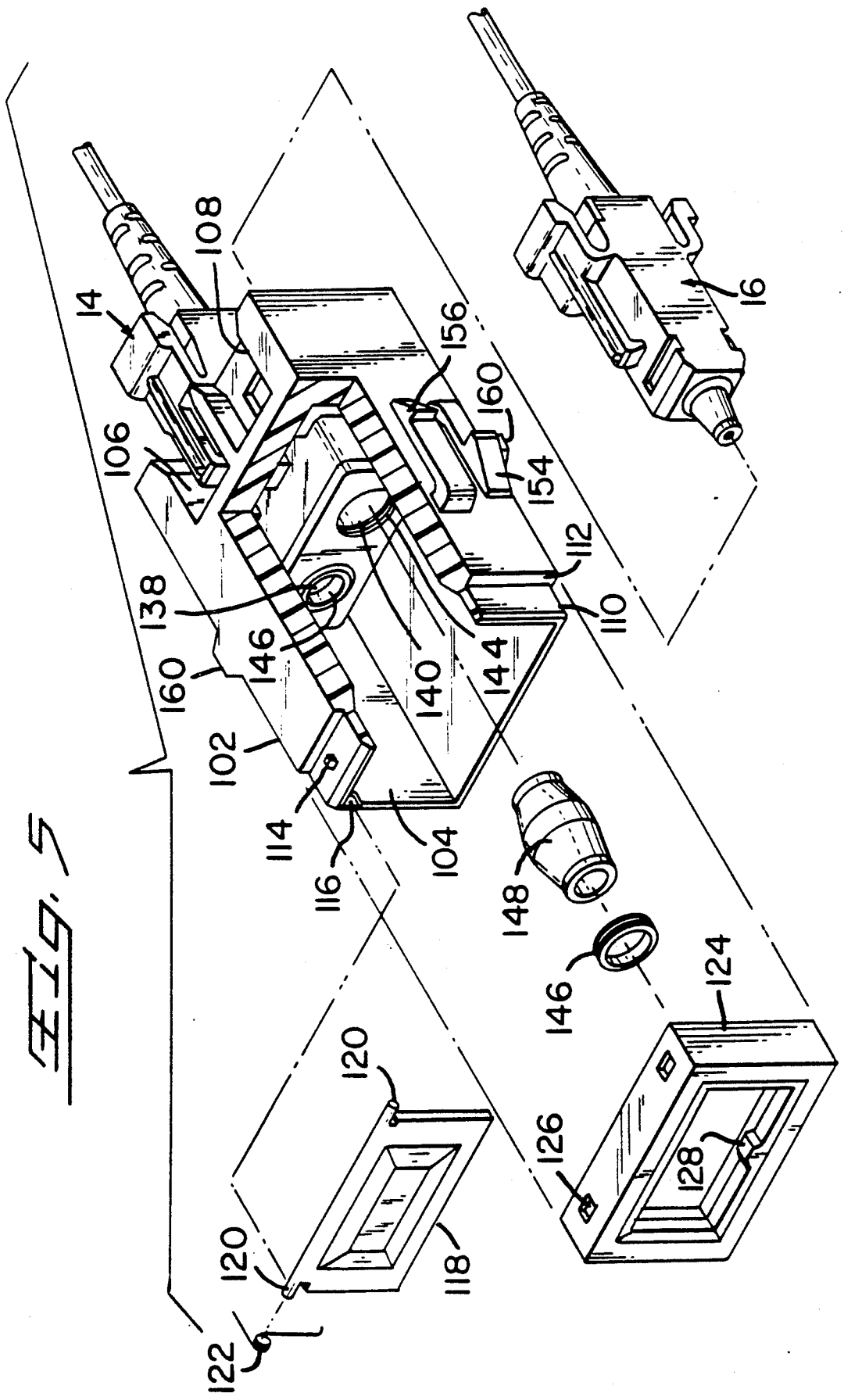

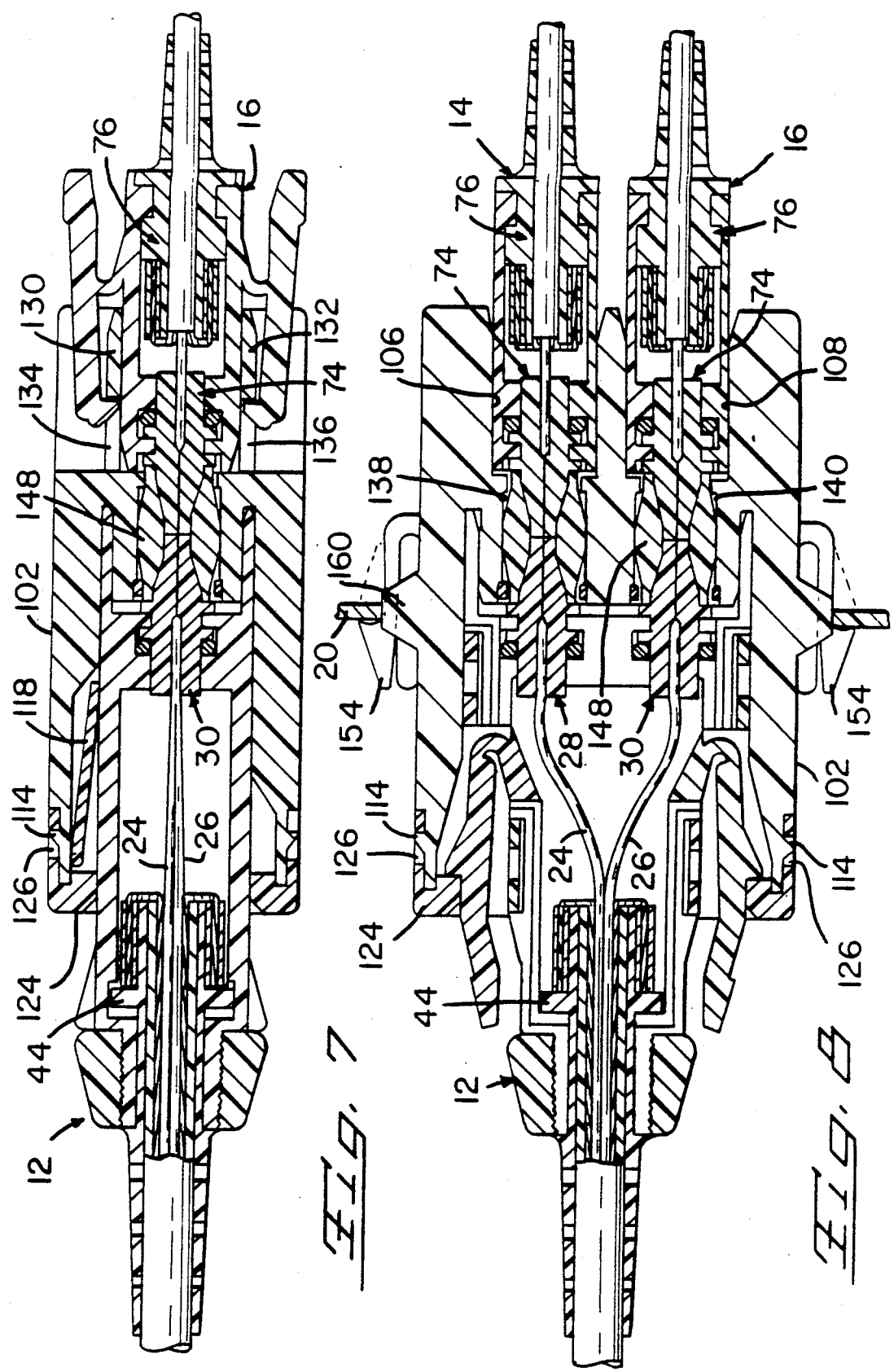

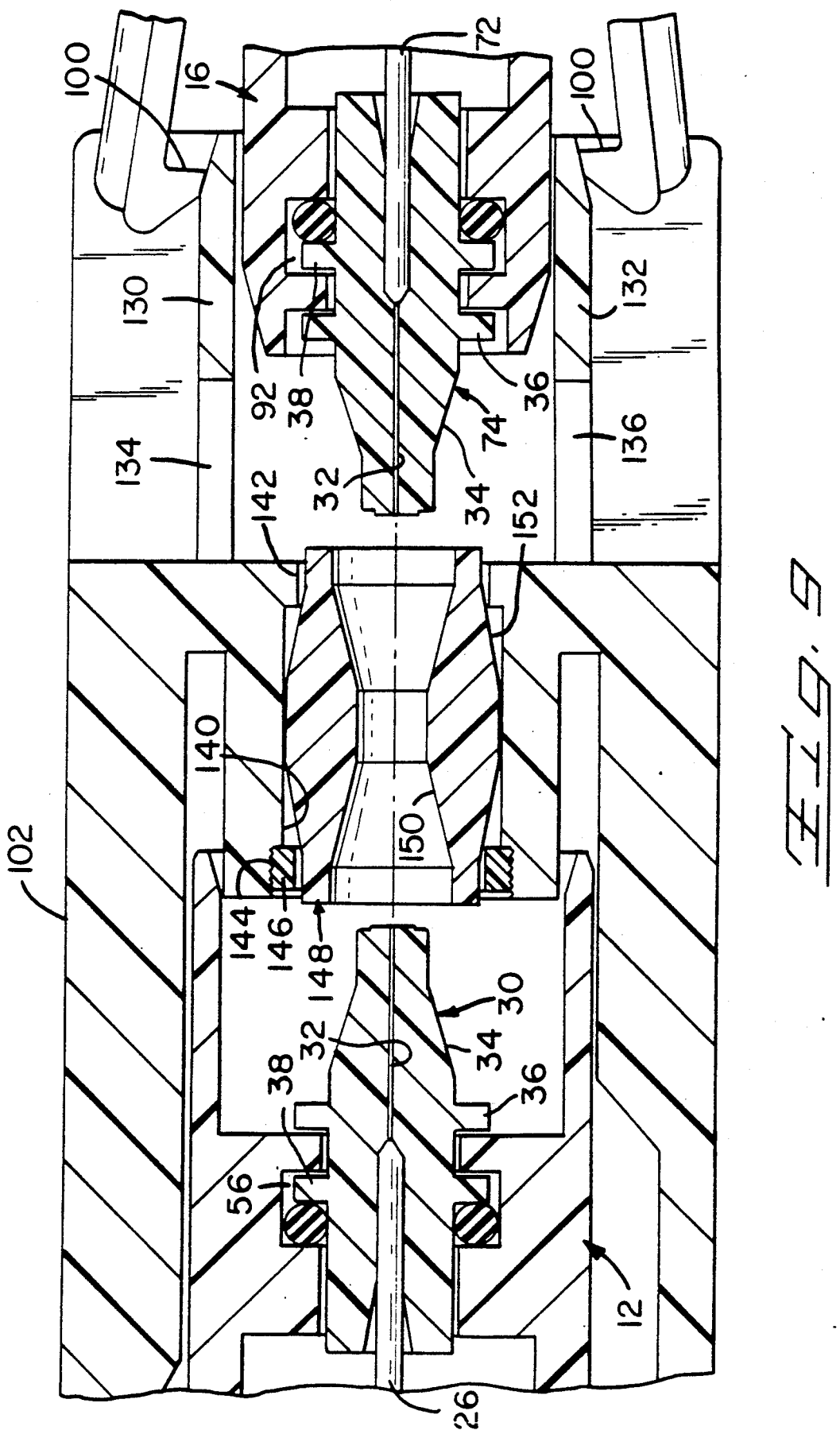

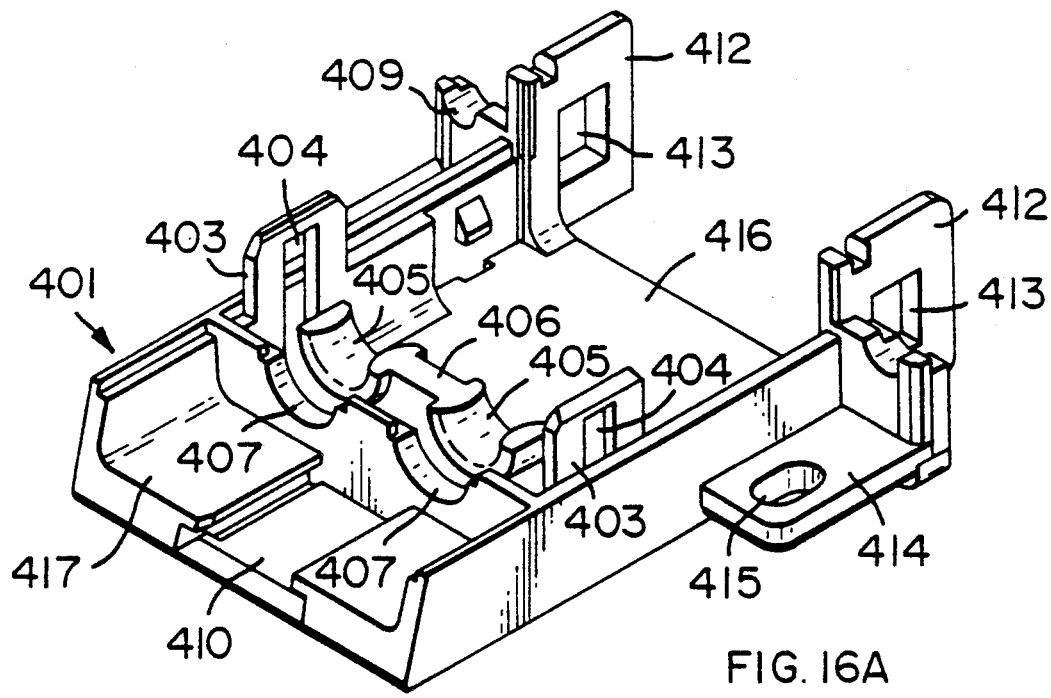
FIG. 16A
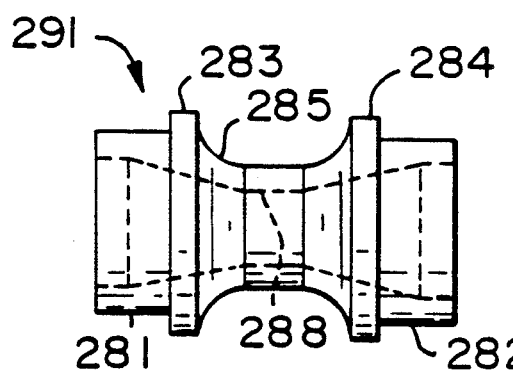
FIG. 15A
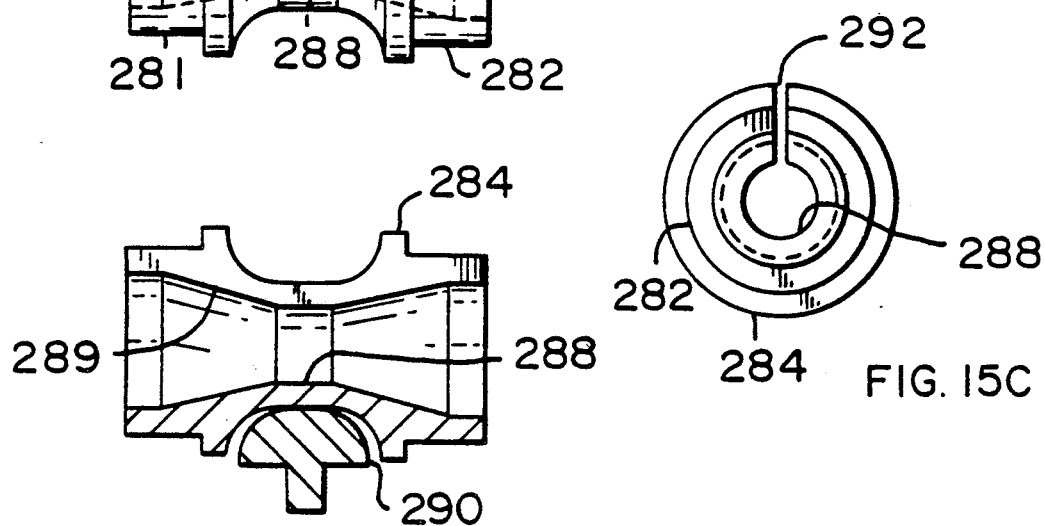
FIG. 15B
FIG. 15C

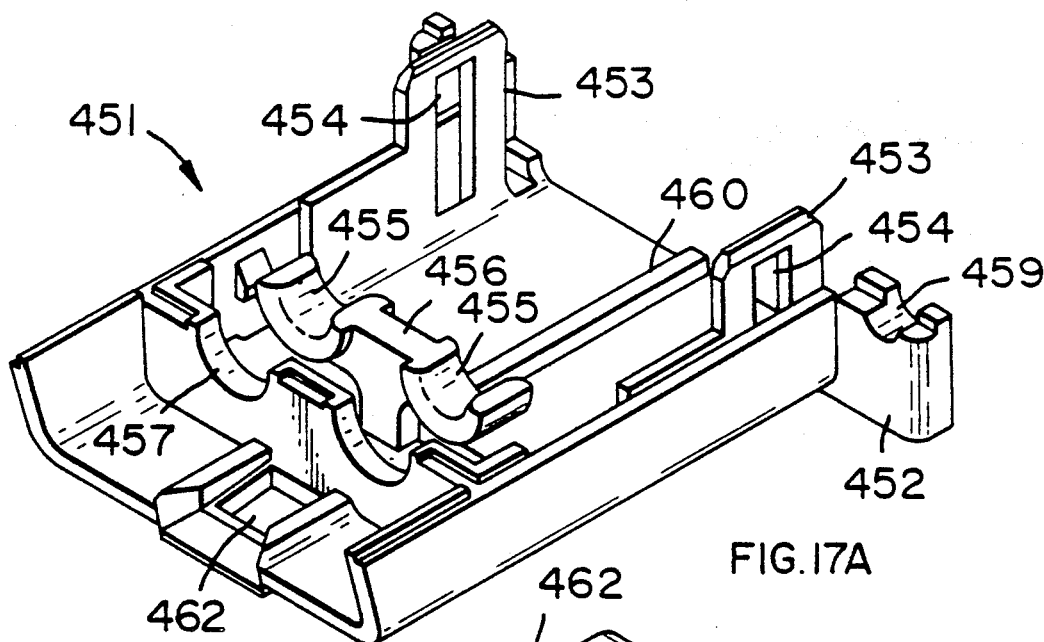
FIG. 17A
FIG. 17C
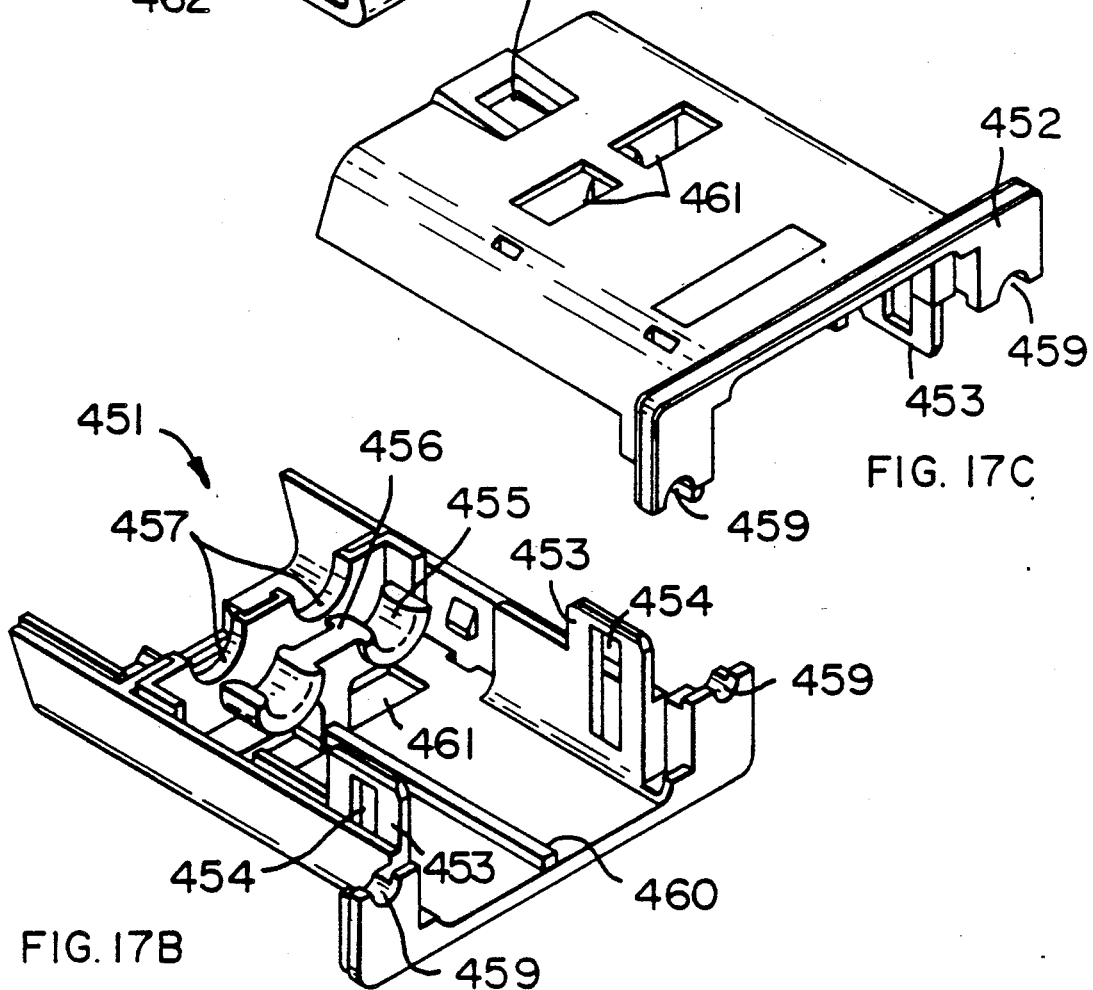
FIG. 17B

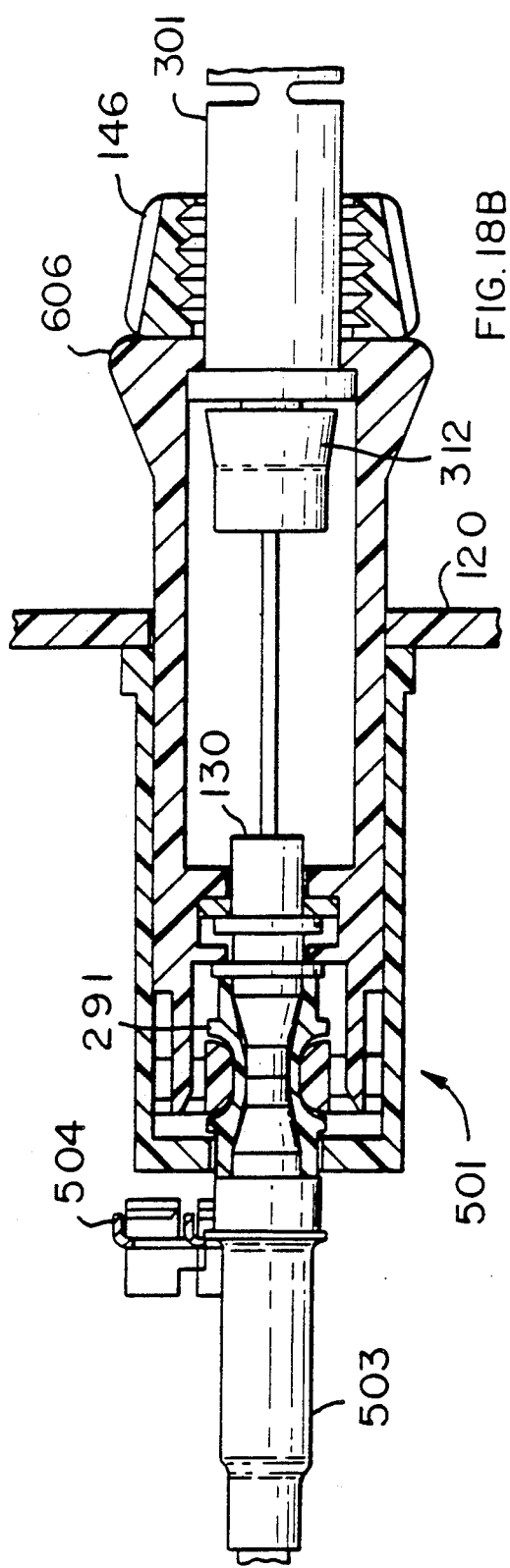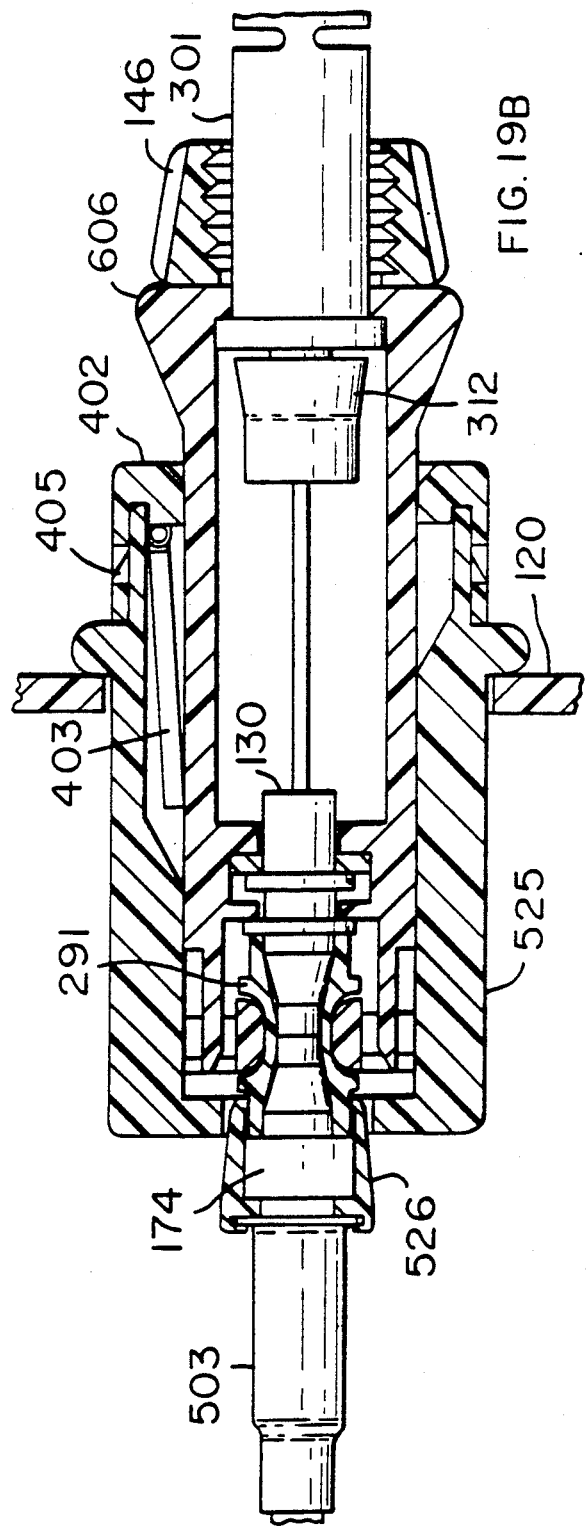

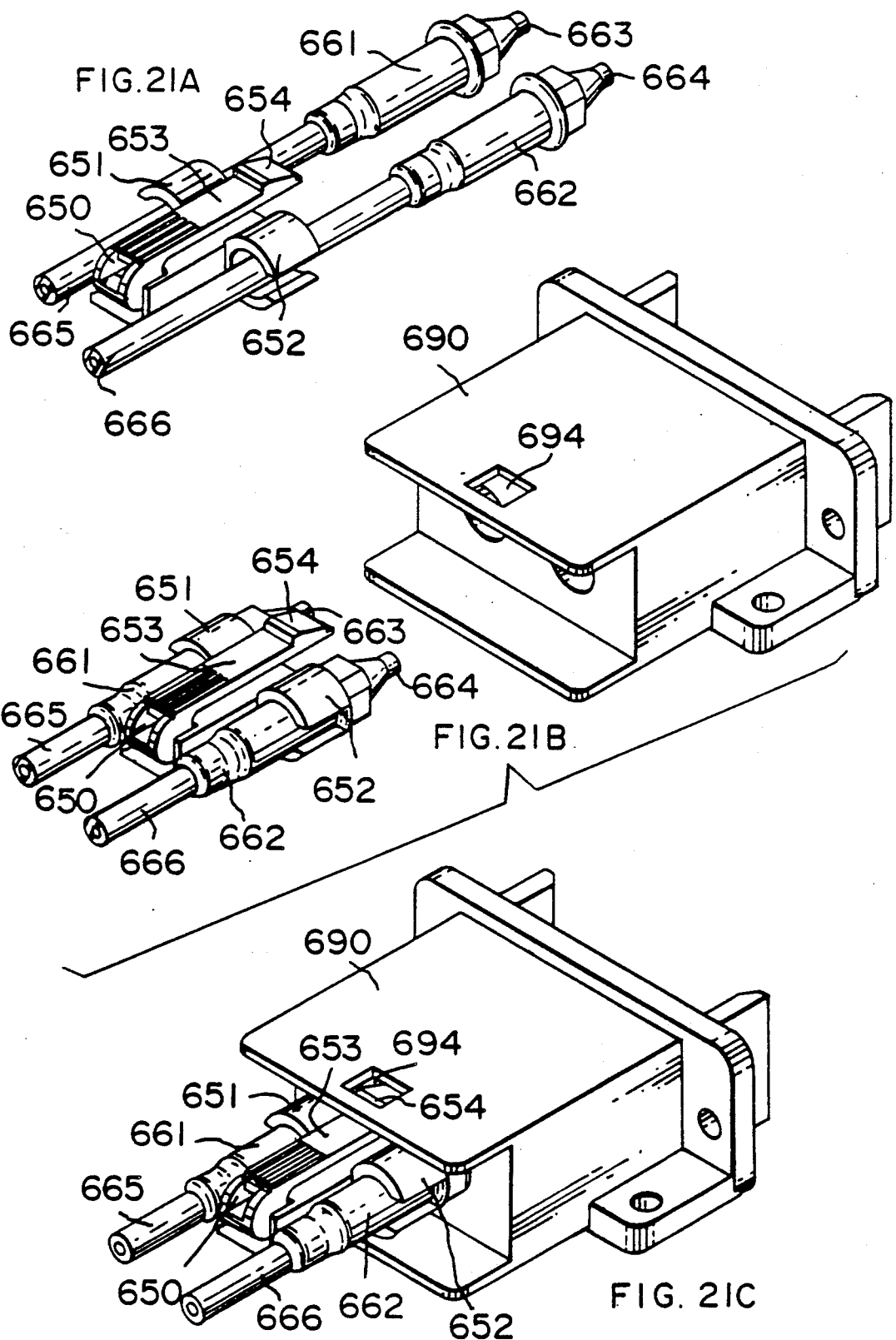

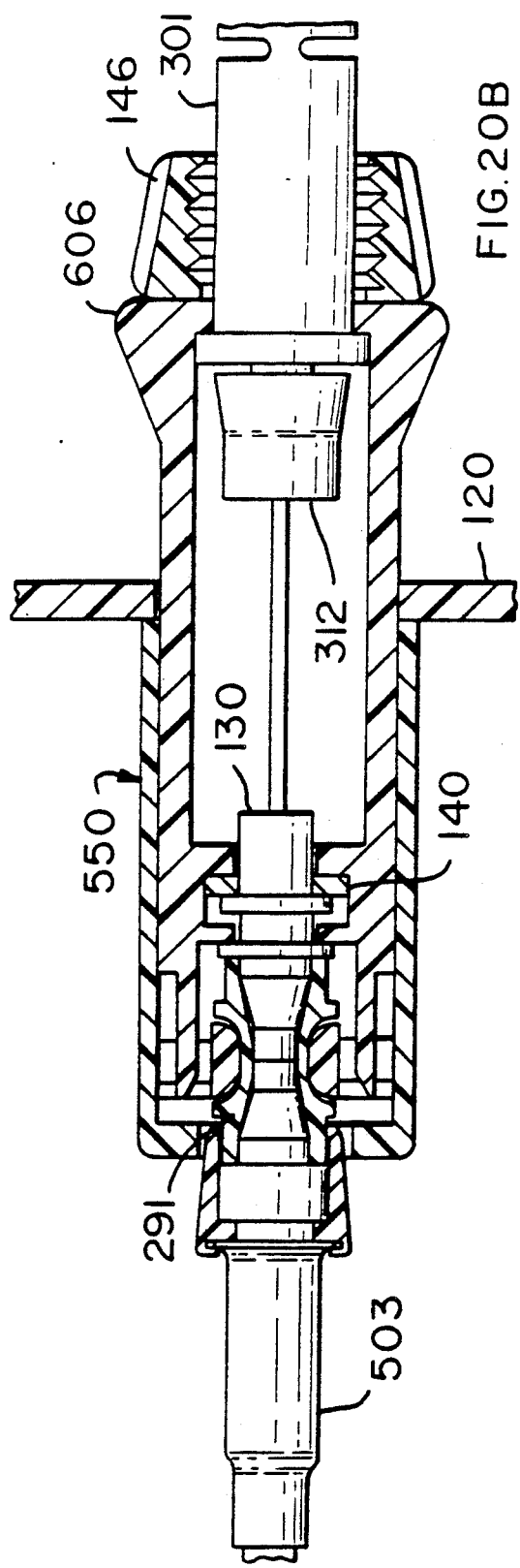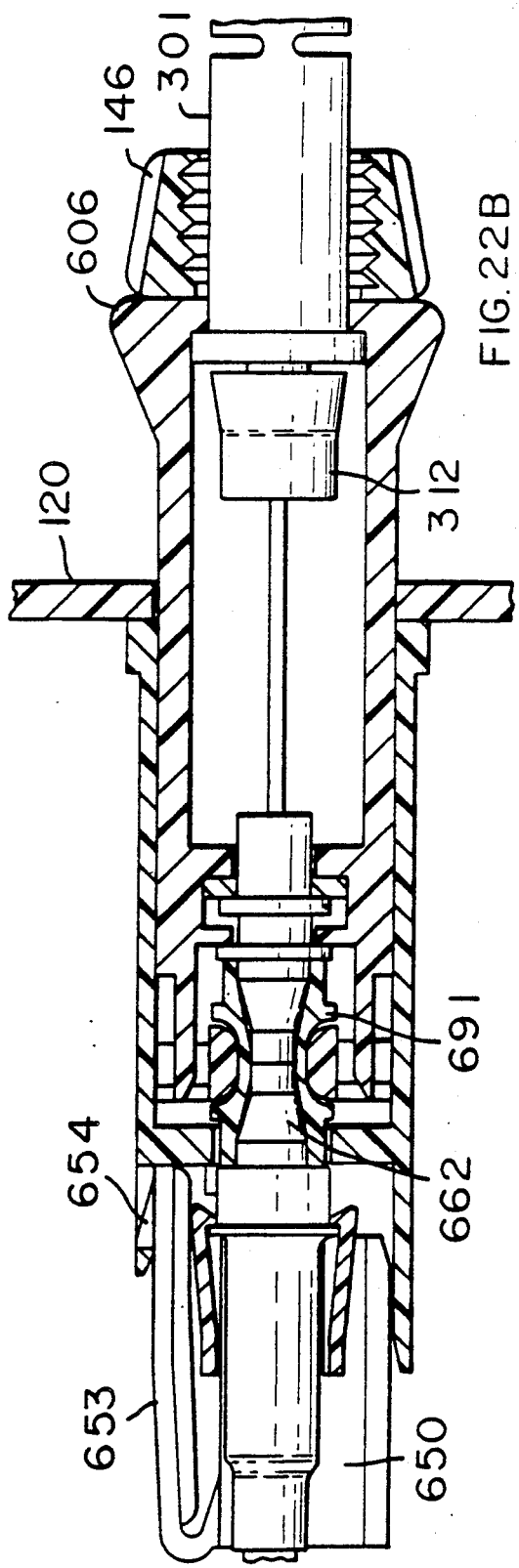

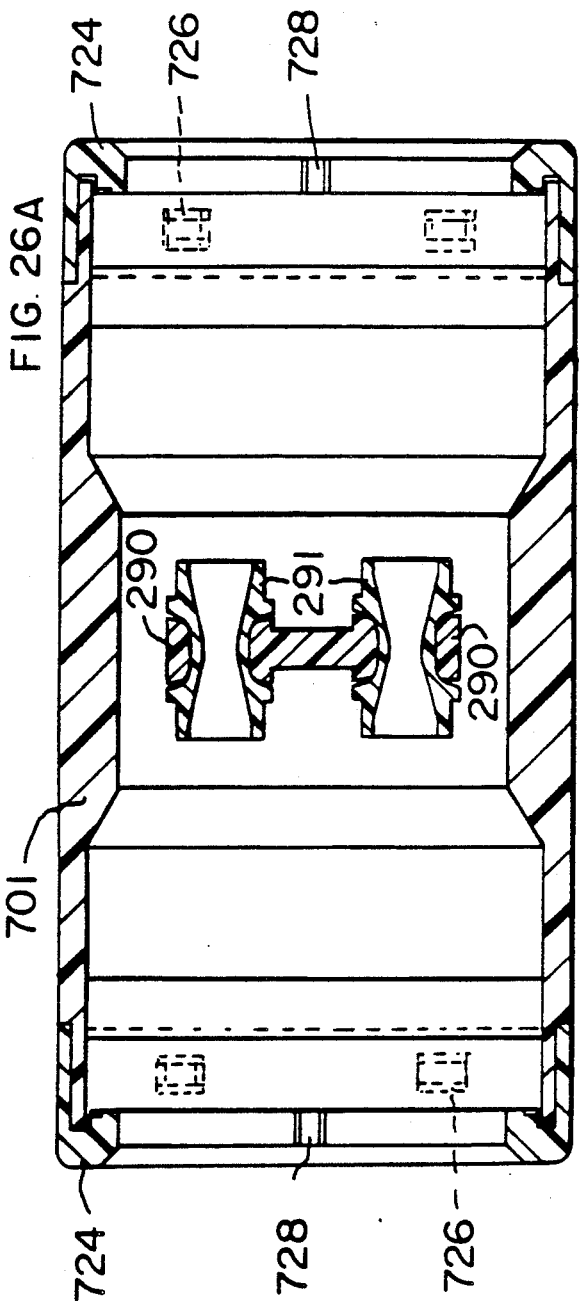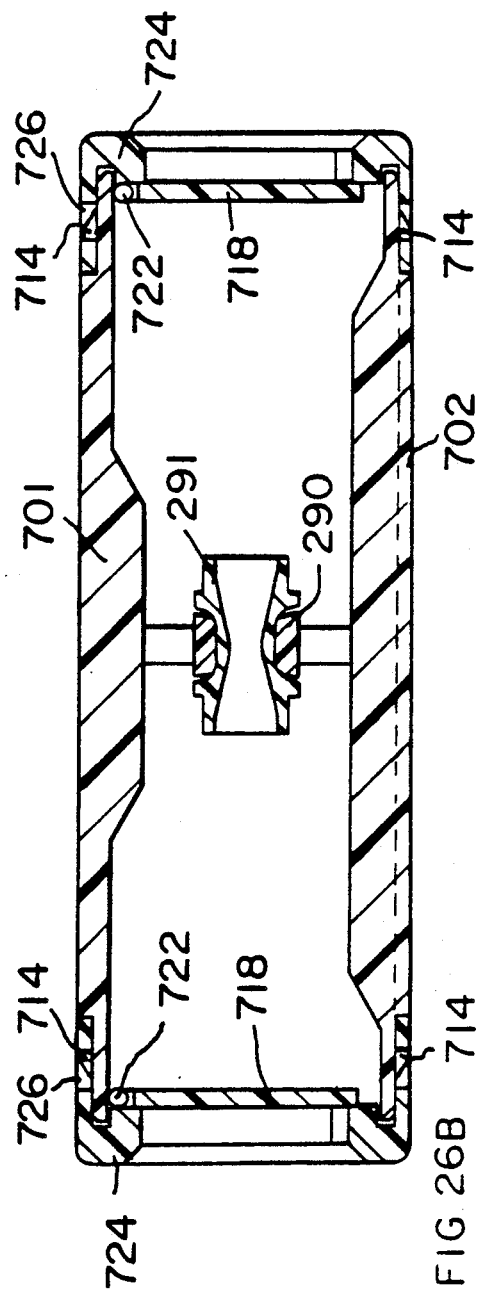

HIGH PRECISION OPTICAL FIBER CONNECTORS

This application is a continuation in part of the following applications:

1. Ser. No. 734,831 filed May 17, 1985, has been abandoned, in turn, a continuation in part of: Ser. No. 618,851, filed June 8, 1984; has been allowed, U.S. Pat. No. 4,687,291;
2. Ser. No. 236,103, filed Aug. 23, 1988, has been abandoned.
3. Ser. No. 287,921 filed Dec. 21, 1988, has been abandoned, in turn, a continuation in part of: Ser. No. 734,821, above, and of Ser. No. 112,188, filed Oct. 26, 1987, has been abandoned, and of Ser. No. 185,756, filed Apr. 25, 1988, has been abandoned; Ser. No. 185,756, in turn, is a continuation in part of: Ser. No. 112,188, above;
4. Ser. No. 328,259, filed Mar. 23, 1989, has been abandoned, in turn, a continuation in part of: Ser. No. 734,831, above, and of Ser. No. 112,188, above, and of Ser. No. 185,756, above, and of Ser. No. 287,921, above.

TECHNICAL FIELD

This invention relates to high precision fiber optic connectors, and in particular, to connectors which provide for precise alignment of mating ferrules at the ends of fiber optic cables, to ensure correct alignment of corresponding optical fibers connected thereby. Further provision is made to ensure correct polarity when connections are made from duplex to duplex or from one duplex to a plurality of simplex cables.

BACKGROUND OF THE INVENTION

One of the primary difficulties in the field of electro-optics, in connecting fiber optic cables to each other or to electro-optical equipment, is the necessity for accurate alignment of optical fibers in order to achieve maximum light exchange between corresponding optical fibers at a connection. The difficulty arises mainly because connecting components, which are for the most part molded, suffer from molding tolerances and inevitable material shrinkage. Therefore, there is always the possibility for misalignment of corresponding connected fibers to occur, even within a batch of like manufactured parts which purport to be identical. The difficulty increases significantly when attempts are made to join multiple fibers by means of a single connector, e.g., as in a duplex to duplex connector.

The art of electrical connectors is well advanced and facilitates a wide range of connections between equipment and signal carrying electrical cables in assorted combinations. A like facility is not presently available to use with fiber optic cables. A need exists, therefore, for fiber optic connectors that will permit inexpensive, quick, easy and reliable connections between fiber optic cables, between pieces of equipment utilizing fiber optics and, for convenience, wall-socket type connectors to permit ready access to data transmitted via fiber optic cables to homes and offices.

DISCLOSURE OF THE INVENTION

Accordingly, it is an object of this invention to provide apparatus for interconnecting a plurality of fiber optic cables whose individual fibers are terminated at ferrules.

It is another object of this invention to provide an interconnector or interface between a simplex fiber optic cable with a ferrule and an active device.

It is yet another object of this invention to provide a wall outlet for duplex cable assemblies whereby fiber optic signals brought through fiber optic cables connected thereto may be easily accessed by a user.

It is a further object of this invention to provide duplex to duplex connection for fiber optic cables in a single housing.

It is an even further object of this invention to provide apparatus for coupling two simplex leads, for insertion into a single tailgate housing, for ease of handling the simplex leads when mating or unmating them with the tailgate housing, which typically may be mounted on a printed circuit board.

It is yet another object of this invention to provide apparatus for coupling a single duplex cable assembly with a plurality of simplex leads in a wall mounted tailgate housing.

It is a further object of this invention to provide fiber optic connectors with dust and dirt excluding doors.

It is an even further object of this invention to provide apparatus for easily self-aligning two ferrules end-to-end inside a fiber optic connector for optical transmission of signals between fiber optic cables connected thereby.

Yet another object of this invention is to provide apparatus that assures strain relief but will not allow a fiber optic cable to be bent beyond a minimum bend radius for which the cable is rated at the point where this cable joins a connector.

These and other related objects of this invention are achieved by providing a family of fiber optic connectors embodying certain novel and unobvious combinations of elements.

A preferred embodiment of this invention overcomes many of the difficulties not hitherto solved in the prior art, particularly in terms of precisely aligning individual interconnected optical fibers, by providing an interconnect device having first and second oppositely directed entry cavities in a housing, the cavities being connected by at least one passage. Each passage is profiled to have an inwardly directed flange at one end and a threaded nut receiving recess at an opposite end. A profiled receptor member is placed in each passage and secured therein by the flange and a nut in the threaded recess. The receptor has a profiled exterior which allows it to pivot about its geometric center and has a profiled axial bore. Each housing cavity is profiled to receive therein at least one fiber terminus, each such terminus preferably formed by a pair of mating hermaphroditic housing members which receive a cable in one end thereof and have a ferrule at the opposite end through which the fiber extends. Each terminus is also provided with means to latchingly engage with the interconnect device housing.

A flexible tubular heavy duty strain relief, for protectively attaching a fiber optic cable to a connector assembly for interconnection with another such cable, is provided with staggered series of elongated wall openings or slots each of which has a small bump or wall extension on a long side and not quite extending across to the opposite side. When the cable within the strain relief is subjected to external forces, these openings allow the strain relief to bend where it is attached to the connector, but the bumps within the openings prevent the formation of a curve in the cable of a radius small enough to destructively strain optical fibers of the cable within.

A ferrule-aligning receptor, profiled externally to have a toadstool-section central support zone, is provided for easy assembly inside a wide range of interconnect housings formed to support such receptors with a small amount of play. The interior profile at either end of the receptor is compatible with the shape of ferrules terminating individual optical fibers. In another embodiment, vacuum relieving vents in the form of cuts in such a receptor are made radially from the inside bore, but not quite through the receptor wall thickness, to relieve the force required to fully insert ferrules therein. In yet another embodiment, an axially aligned narrow cut is made all the way through on one side, and through the flanges, whereby the force required to insert ferrules into either end of the receptor is reduced even further.

For convenient handling of simplex, i.e., single fiber, terminal ferrules to be connected to interconnect housings mounted on printed circuit boards and the like, a simplex fiber optic terminal carrier is provided having a flat base and a cantilevered latching arm that carries simplex terminals in clips on either side. Thus two such terminals are securely lodged together on the carrier and the carrier pushed into a tailgate housing for interconnection with mating cables, e.g., by a duplex connector, with ferrule-alignment obtained via ferrule aligning receptors as discussed previously.

To facilitate convenient interconnection between sources of optical signals and equipment that will utilize or further transmit such signals accurately, a cable connector is provided that can be inserted into a variety of interconnect members, both permanently mounted and in the form of small and light interconnect housings. By attaching such a connector to each end of a fiber optic cable one has available the fiber optics analog to an electrical extension cord for interconnecting equipment elements. The ferrules inside and at the end of the respective connectors will be accurately aligned by means of ferrule-aligning receptors mounted inside the interconnect members or housing.

BRIEF DESCRIPTION OF THE DRAWINGS

FIG. 1 is a perspective view of a fiber optic connector system, according to the present invention, in a fully assembled condition;

FIG. 2 is a perspective view of the fiber optic connector system of FIG. 1, with two of the mating connectors exploded therefrom;

FIG. 3 is an exploded perspective view of a duplex fiber optic connector;

FIG. 4 is an exploded perspective view of a simplex or single fiber connector;

FIG. 5 is a perspective view, partially exploded and partially in section, showing the details of an interconnect housing;

FIG. 7 is a longitudinal section taken along line 7—7 of FIG. 1;

FIG. 8 is another longitudinal section taken along line 8—8 of FIG. 1;

FIG. 9 is an enlarged section, similar to FIG. 7, showing the connectors in an unmated condition;

FIGS. 15A and 15B are the side elevation and longitudinal cross-section, respectively, of a modified version of the bushing of FIGS. 14A and 14B. FIG. 15C is an end view showing an axially aligned split along one side of the modified bushing.

FIGS. 16A-16C are exterior perspective views of the bottom half of a panel-mount tailgate for a duplex-to-two-simplex fiber optic interconnect housing, with toad-stool type support for ferrule-aligning bushings.

FIGS. 17A-17C are exterior perspective views of the top half of the panel-mount tailgate whose bottom half is illustrated in FIGS. 16A-16C.

FIGS. 18A and 18B are horizontal and vertical sectional views, respectively, of a wall-mounted tailgate without a dirt and dust excluding door.

FIGS. 19A and 19B are horizontal and vertical sectional views, respectively, of a wall-mounted tailgate housing provided with a dirt and dust excluding door.

FIGS. 20A and 20B show a variation of the tailgate housing of FIGS. 18A and 18B with a different structure to receive two simplex connectors.

FIGS. 21A-21C are perspective views of a first embodiment of a simplex cable terminal carrier into which are clipped two simplex connectors for attachment to a wall mounted tailgate.

FIGS. 22A and 22B are partial horizontal and vertical sectional views of a wall-mounted tailgate providing interconnection between a duplex cable and two simplex cables clipped into a simplex terminal carrier like the one shown in FIGS. 21A-21C.

FIGS. 26A and 26B are horizontal and vertical sectional views of a duplex-to-duplex coupling housing with two dust and dirt excluding doors and with toadstool support for ferrule aligning bushings supported within.

DESCRIPTION OF THE INVENTION

Figure 6:
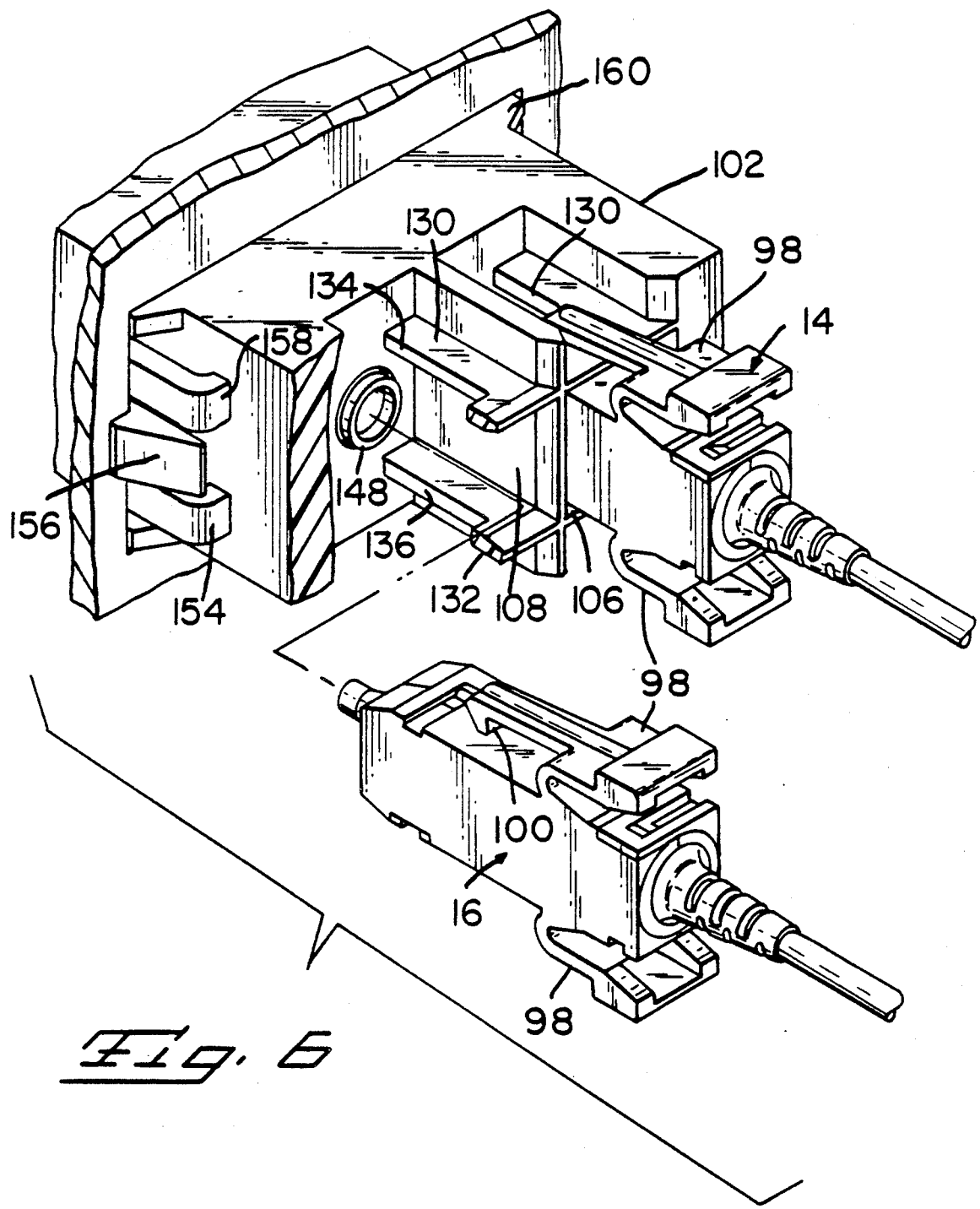
FIG. 6 is a perspective view, partially in section, taken from the opposite direction of FIGS. 1 and 5 with one single cable connector exploded therefrom.

In a preferred embodiment of the fiber optic interconnect apparatus of this invention, shown in perspective view in FIGS. 1 and 2, the duplex fiber optic connector 110 comprises a duplex cable connector 112 and a pair of single cable, i.e., simplex, connectors 114, 116, all mating with an interconnect housing member 118 mounted in a suitably shaped aperture 169 in bulkhead 120.

Considering the duplex cable connector 112 first, and referring to FIG. 3, the fiber optic cable 122 is of known construction and is provided with a pair of fibers 124, 126, each of which is terminated by separate ferrules 128, 130. The ferrules 128, 130 are preferably formed of plastics material and each has a fiber receiving axial bore 132, a profiled nose 134, a pair of annular flanges 136, 138 and an O-ring 140. The cable 122 is provided with a strain relief 142 having an integral annular flange 144 and a nut 146. The duplex connector 112 comprises a pair of hermaphroditic cover members 148, 150 which fit together to define an externally threaded cable entry 152, a central cavity 154, a pair of profiled passages 156, 158 and a mating face 160. The cover members 148, 150 are provided with interengaging latches 162 and lugs 164, and also include latching arms 166 which have outwardly directed latching lugs 168.

A single fiber connector, i.e., a simplex connector, is shown in detail in FIG. 4 with a cable 170 having a single fiber 172 terminated by a ferrule 174 which is identical to the ferrules 128, 130 previously described. The cable 170 also is provided with a strain relief 176 having integral annular flanges 178, 180 defining a recess 182 therebetween. A housing is formed by a pair of mating hermaphroditic cover members 184, 186 which together define a profiled cable entry 188, a central cavity 190, profiled passage 192, interengaging latches 194, and lugs 196. Each cover member also has a pivotal latching arm 198 with an inwardly directed latching shoulder 200.

The interconnect member 118 can best be understood from FIGS. 5 to 8. The interconnect member 118 has a housing 202 defining a first cavity 204 and oppositely directed second and third cavities 206, 208 The first cavity 204 is profiled to receive the duplex connector 112 therein and has a stepped annular flange 210 at its open end defining an outwardly directed annular shoulder 212, outwardly directed integral lugs 214, and oppositely spaced inwardly directed recesses 216. A door 218 is mounted across the opening of the first cavity 204 with pivots 220 received in respective recesses 216. At least one spring 222 is mounted on one of the pivots 220 to bias the door to a closed position. An annular member 224 is mounted on the stepped flange 210 with lugs 214 engaging apertures 226 to secure it in place The member 224 serves to retain and stop door 218, as engagement for the latching lugs 168 of the duplex connector 112, and is provided with a polarizing and/or keying projection or lug 228.

Figure 10:
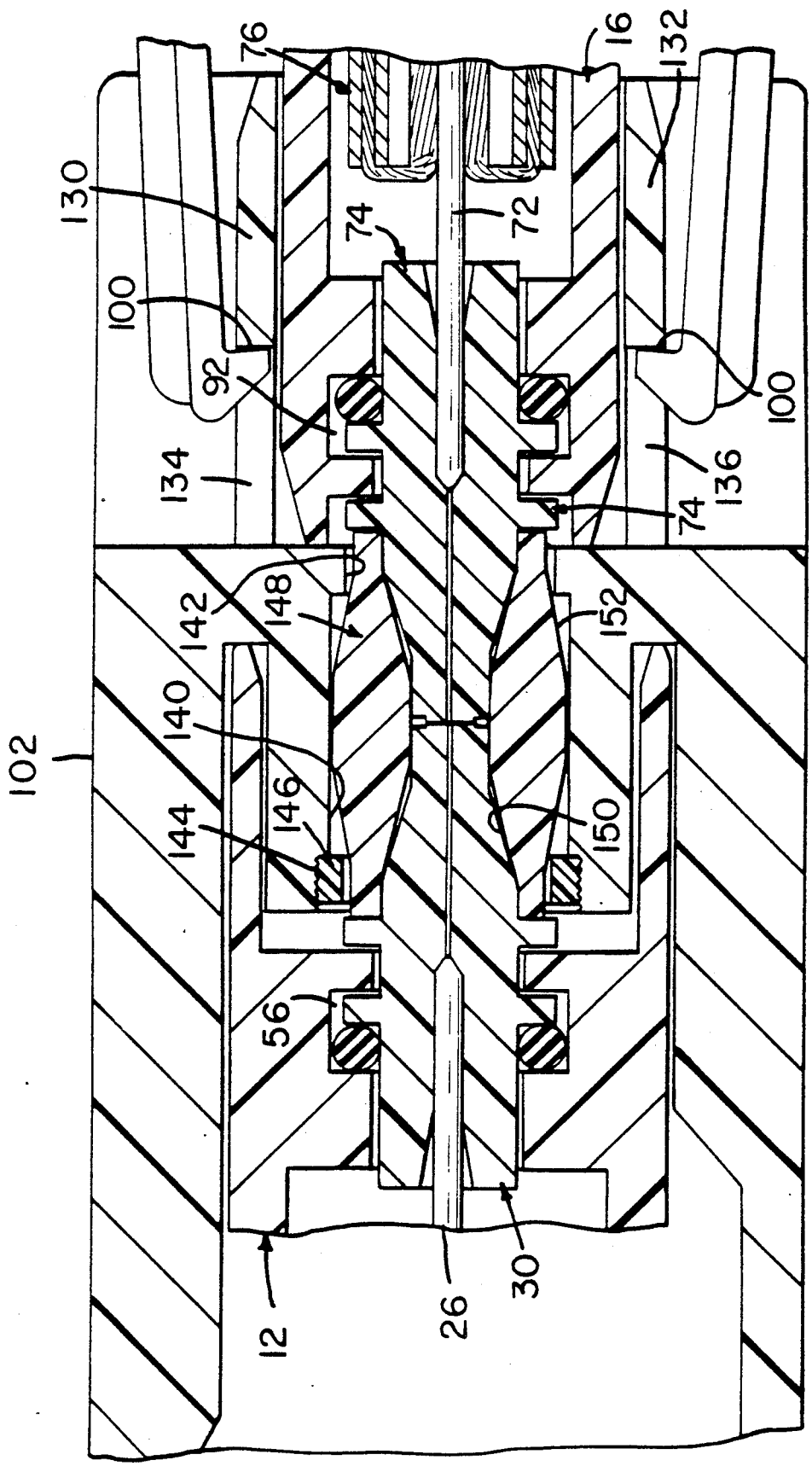
FIG. 10 is an enlarged section, similar to FIG. 9, showing the connectors in a mated condition.
Figure 11:
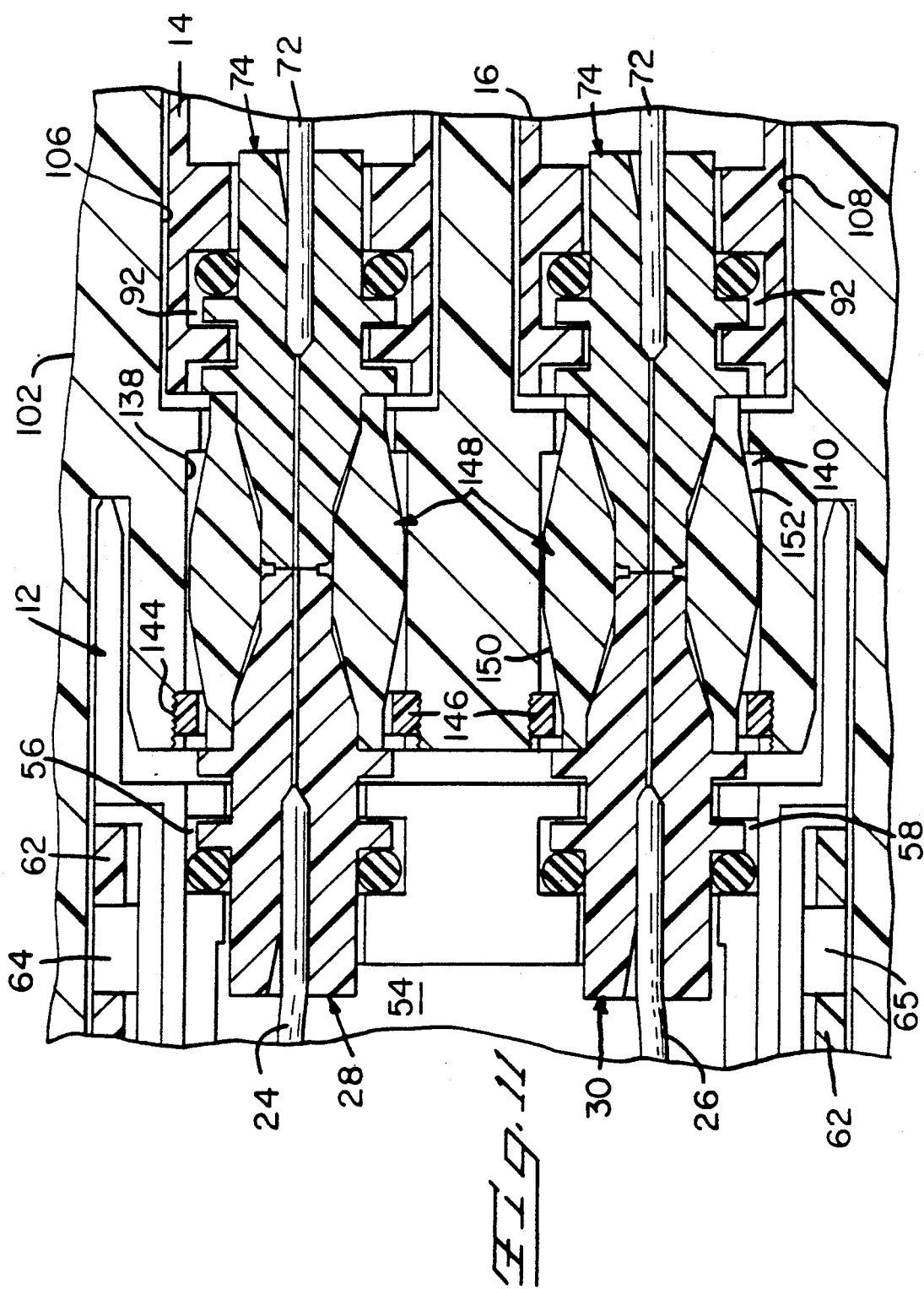
FIG. 11 is an enlarged detailed section similar to FIG. 8.

The second and third cavities 206, 208 are each profiled to receive a respective single fiber connector, e.g., 114, 116, therein. Each cavity 206, 208 has opposite spaced sidewalls 230, 232 having therein apertures 234, 236 aligned to receive the latching shoulders 200 of the latching arms 198 of the respective single fiber connectors 114, 116. The first cavity 204 is connected to the second and third cavities 206, 208 by passages 238, 240, respectively. Each passage 238, 240 (see FIGS. 9 to 11) is provided with an inwardly directed flange 242 on a first end and an internally threaded portion 244 on the opposite end which receives an exteriorly threaded nut 246 therein.

A receptor 248 is mounted in each passage 238, 240 and held therein by flange 242 and nut 244. The receptor 248 has a profiled axial bore 250 and a profiled exterior surface 252. The profiled bore 250 receives the fiber carrying ferrules 130, 174 in opposite ends thereof and the profiled exterior 252 allows the receptor 248 to pivot about its geometric center to accommodate for any misalignment of the ferrules 130, 174.

The housing 202 is completed by a plurality of mounting arms 254, 256, 258 which are similar to the mounting arms shown in U.S. Pat. No. 3,989,343, the disclosure of which is incorporated herein by reference, and by alignment lugs 260.

The subject system is assembled by first terminating each fiber 124, 126, 172 with a respective ferrule 128, 130, 174. This is done in the well-known fashion of stripping the cladding from the fiber, inserting the fiber through the bore of the ferrule, securing it in place by adhesive means, cutting and polishing the end of the ferrule and fiber to get a smooth planar surface. The cables 122, 170 are then placed in their respective covers 148, 150 and 184, 186 respectively, with the ferrules 128, 130, 174 received in the profiles 156, 158, 192, the flanges 136, 183 generally positioning the ferrules and the O-rings 140 allowing for a resilient or somewhat floating mount when the covers are closed. The flange 144 engages the end of the cavity 154 (see FIG. 3) and the flanges 178, 180 grip the profiled entry 188 to provide strain relief for the cables 122, 170. The covers are secured together by engaging the latches 162, 194 on their respective lugs 164, 196. Cable nut 146 is applied to the threaded entry 152.

The interconnect member 118 is assembled by first inserting the receptors 248 into their respective passages 238, 240 and securing them in place by the nuts 246. The interconnect member 118 is then mounted in an aperture 169 of a panel or bulkhead 120. Due to the arrangement of the latching arms 254, 256, 258, the interconnect member 118 can be inserted from either side of the bulkhead 120. It is generally centered by the lugs 260.

Mating of the connectors 112, 114, 116 is achieved simply by applying the duplex connector 112 to open door 218 to be received in the cavity 204, and the single connectors 114, 116 being latched into the cavities 206, 208. The latching arms 166, 198 of the connectors engage with the housing 202 to secure the connectors in place.

It will be appreciated from FIGS. 7 through 11 that the receptor 248 is free to move, and in combination with the limited float of the respective ferrules it will cause each interconnecting pair of the ferrules to assume an axially aligned condition.

The normal mounting of the interconnect member 118 is with the duplex portion to the outside of a cabinet or module. Door 218 is provided on this end of member 118 to keep ambient dust from entering the interface area and detracting from the effectiveness of the coupling.

In enhancing the facility with which fiber optic connectors may be utilized, particularly by rendering fiber optic cables easy to plug in and out of interconnectors much the way electrical extension cords are freely utilized, it is inadvisable to allow a fiber optic cable to be bent to such a small radius that the resultant physical strain causes actual physical damage to the individual optical fibers. Thus, for example, as depicted in FIG. 4, strain relief 176 comprises a tapered cylindrical flexible end 187 provided with alternate staggered, oppositely-located partial cuts 189 which, in effect, provide flexible stiffening of the outer sheath of cable 170 where it enters strain relief 176. While this may suffice for careful use under many circumstances, it may not be sufficient protection against the cable bending to too small a radius under all circumstances of use.

FIGS. 12A–12C illustrate an alternative embodiment which provides heavy duty protection against bending of the fiber optic cable to unacceptably small radii due to externally encountered physical loads. Such a heavy duty strain relief 301 has a short generally right-cylindrical end portion 311, a short flange 309 provided with oppositely located flats 310 and 313, followed by a generally cylindrical portion 302 which ultimately tapers towards the other end. A cylindrical bore 304 axially aligned through 301 is sized to comfortably accommodate the exterior diameter of a fiber optic cable such as 170. Overlapping, alternately positioned, staggered series of openings 305 and 306 are provided in the tapered portion of strain relief 301 to allow greater flexibility in that portion thereof. However, to ensure that the tapered portion and individual optical fibers contained therewithin will not be bent to too small a radius, each cut is provided with a generally semi-circular mid-position internal side extension of predetermined size on one long side of each of the openings (FIG. 12A). Thus extension 307 provided in opening 305 does not extend all the way across the width of the cut. Likewise for semi-circular extension 308 in typical opening 306. The presence of these semi-circular extensions 307 and 308 in strain relief 301 allows flexible connection between the cable end and the strain relief while limiting in a predetermined manner, by choice of shape and size of extensions 307 and 308, the minimum radius that the cable can attain due to lateral external forces acting on the cable to bend the tapered portion of strain relief 301. The particular heavy duty strain relief shown in FIG. 12A has in the right cylindrical end portion 311 a cantilevered extension 312, within an opening 313 surrounding it on three sides, to permit latching attachment within a suitably sized cylindrical aperture Such an aperture may be the inside of a cable clamp.

Yet another embodiment employing the extensions within the series of openings, as described in the preceding paragraph, is depicted in FIGS. 12B and 12C respectively. Thus, in FIG. 12B, heavy duty strain relief 326, while generally similar to heavy duty strain relief 301, has flanges 329 and 330 separated by a short right cylindrical portion 331. Details of the cantilevered extensions 337 are clearly seen in FIGS. 14B and 14C. Here again, cylindrical bore 328 through strain relief 326 comfortably accommodates a fiber optic cable passing therethrough. Extensions 335 and 336, in cuts 333 and 334 respectively, serve to provide a predetermined limitation to the smallest radius that can be taken up by a cable passing through the strain relief when subjected to lateral externally applied forces.

Figure 12:
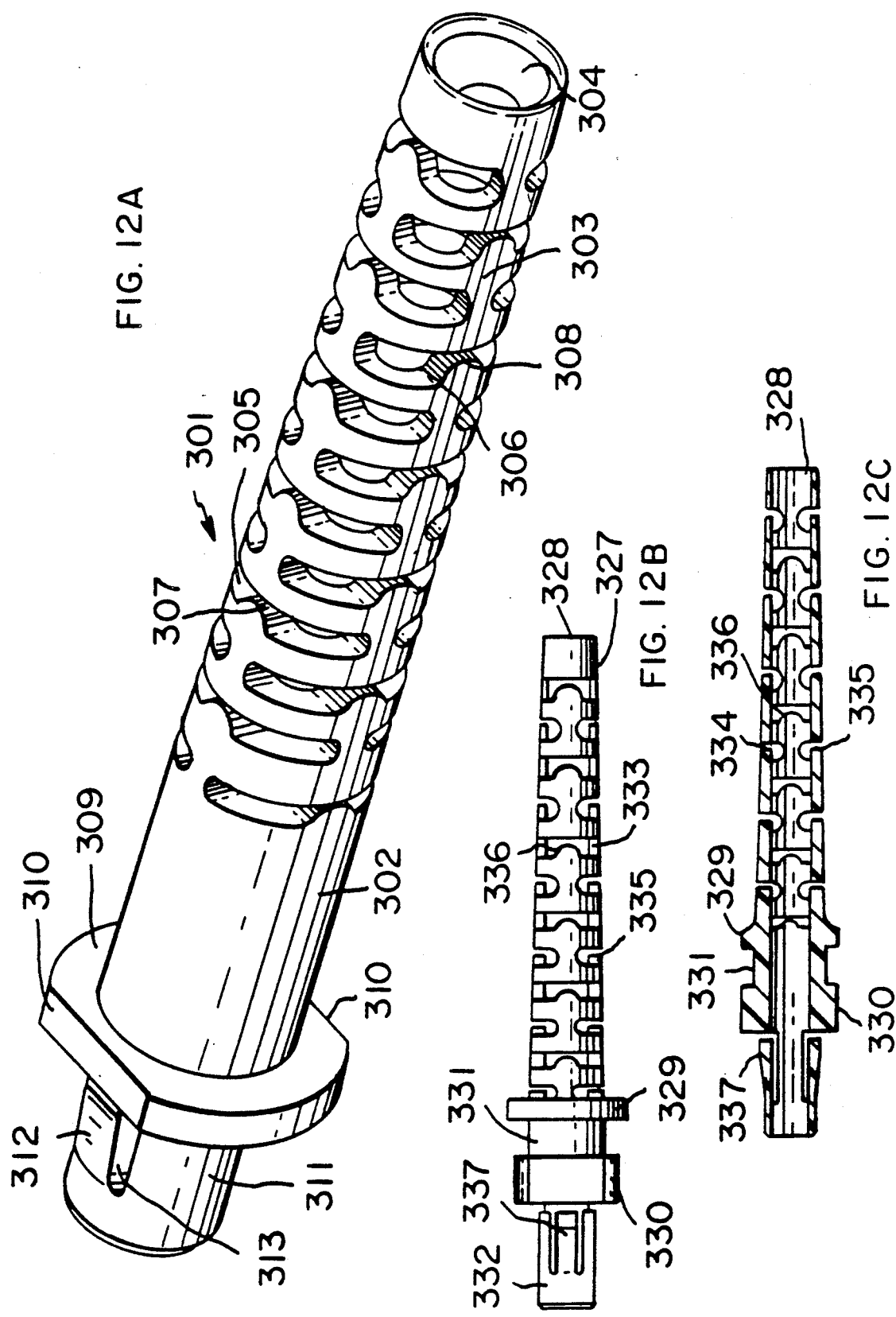
FIG. 12A illustrates one variation of a heavy-duty strain relief.
FIGS. 12B and 12C are the side elevation and longitudinal cross-sections, respectively, of a modified version of this heavy-duty strain relief.
Figure 13:
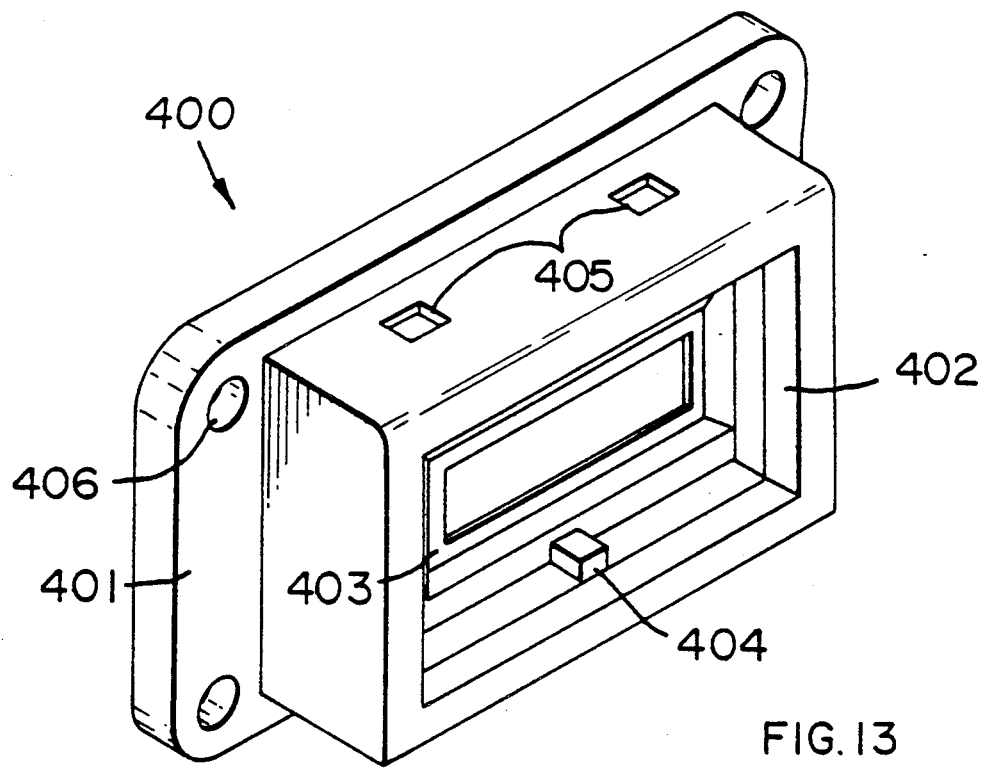
FIG. 13 is an external perspective view of a high-profile panel-mount fiber optic interconnect tailgate housing with a dirt and dust excluding door.

In an alternative form of the above described interconnect device, as best seen in FIG. 13, external lugs 256, 254 and 260 are eliminated from the housing cover members of the interconnect device. Likewise, annular member 224 is eliminated and in its place is provided an external cover or tailgate 400 as shown in FIG. 12. This panel mount interconnect 400 has a flat, generally rectangularly shaped flange 401 and a front rectangular opening 402 in which is provided a pivoting spring-biased door 403 to keep out dust and dirt. A small lug 404 is provided to allow polarization or keying control when duplex connectors are used. Apertures 405 at the top of external cover 400 are positioned so as to latch onto lugs provided in the two halves which together comprise the interconnect member 118. This type of tailgate housing may conveniently be referred to as a high profile interconnect wall mounted tailgate housing. It is mounted to the exterior of a panel 120 by means of bolts or screws passing through apertures 406 provided therefor in flange 401.

Figure 14A:
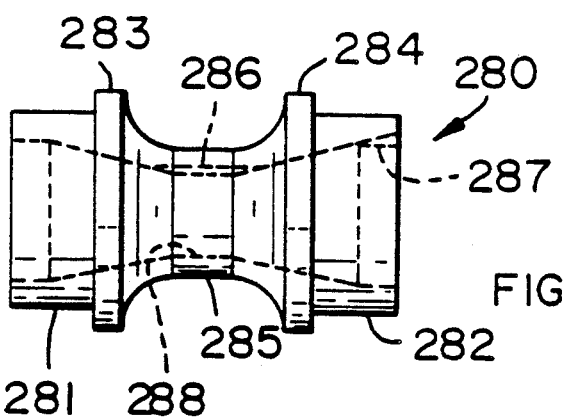
FIGS. 14A and 14B are the side elevation and longitudinal cross-section, respectively, of a ferrule-aligning bushing with an exterior toad-stool shape profile.
Figure 14B:
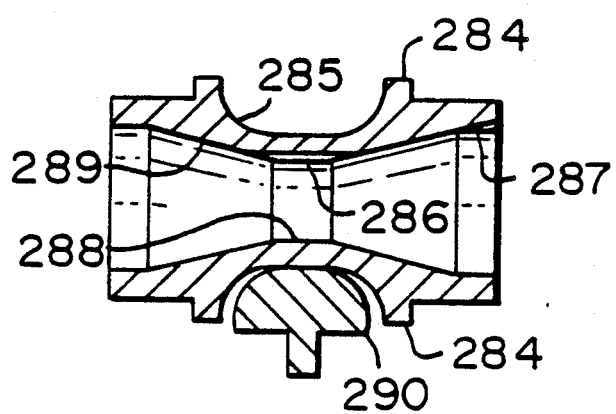
Figure 14C:
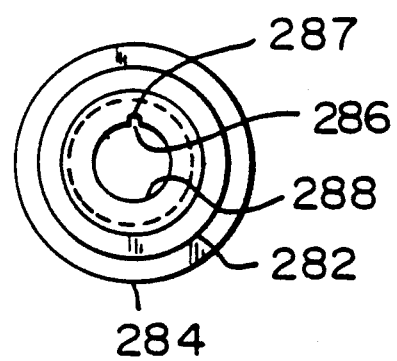
FIG. 14C is an end view of the same bushing.

The insertion of individual ferrules into bushing 248 (best seen in FIG. 5) requires the application of a certain amount of force to ensure proper alignment of mating ferrules held therein. An alternative embodiment of a ferrule-aligning bushing 280 is shown in FIGS. 14A–14C. Bushing 280 has two right cylindrical ends 281 and 282 and two annular flanges 283 and 284, of somewhat larger diameter. Between flanges 283 and 284, as best seen in FIG. 14A, is provided a symmetrical profile 285 similar to that of the curved cross sectional portion of a toadstool shaped encircling support 290. FIG. 14B, which depicts bushing 280 in longitudinal cross section, shows an internal profile of the bore having preferably right cylindrical portions adjacent each end which taper towards a central cylindrical portion 288 of smaller diameter. As best seen in FIGS. 14B and 14C, a longitudinal cut 286 is provided from one side in the central portion of alignment bushing 280, and another relatively shorter cut 287 is provided at one end. Neither cut extends radially through the wall of bushing 280. Cut 286 relieves the bushing wall thickness and ensures that insertion of a tapered ferrule end from that side will require a lower insertion force than would be the case without this cut 286. The cut is not very deep and the removal of material essentially makes the central portion of bushing 280 somewhat more flexible than was the case without the cut. Cut 287 has a different purpose, namely to provide a relief groove through which air and moisture can flow when ferrules are connected by bushing 280. An annular support, of toadstool cross-section 290, formed as a part of the interior of an interconnect housing, surrounds this central portion of 280 and supports it in a manner that permits it to center itself about its midpoint while accommodating minor imperfections in the molding of inserted ferrule ends from one or both sides.

In another embodiment of the toadstool type bushing, 291, best seen in FIGS. 15A through 15C, a narrow axially aligned cut is made all the way through one side of the bushing. This cut 292 is best seen in FIG. 15C. The result is that what was a completely circular bushing now has a split, on one side, aligned with its axis. Cut 292 provides relief to the bushing so that the insertion of ferrules from either or both ends is accomplished with even less force than was the case with the embodiment described immediately above and depicted in FIGS. 14A–14C.

Interconnect member 118 depicted in FIGS. 1–3 and 5, is designed to operate with ferrule aligning bushings 248 which are threaded in and locked into place by threaded elements 246. As will be recognized by persons skilled in the art, it is necessary to modify the structure within the two hermophroditic halves 148 and 150 of interconnect member 118, to hold either the type of toadstool supported ferrule aligning bushing depicted in FIGS. 14A through 14C or the axially split toadstool supported split bushing depicted in FIGS. 15A through 15C. Such a modified embodiment is shown in FIGS. 16A-16C and 17A-17C which illustrate the details of the bottom and the top halves, respectively, of an interconnect member suited for use with printed circuit boards (PCB). The PCB mounted interconnect tailgate 400 is formed by the combination of cooperating top and bottom halves 451 and 401 respectively.

Figure 16B:
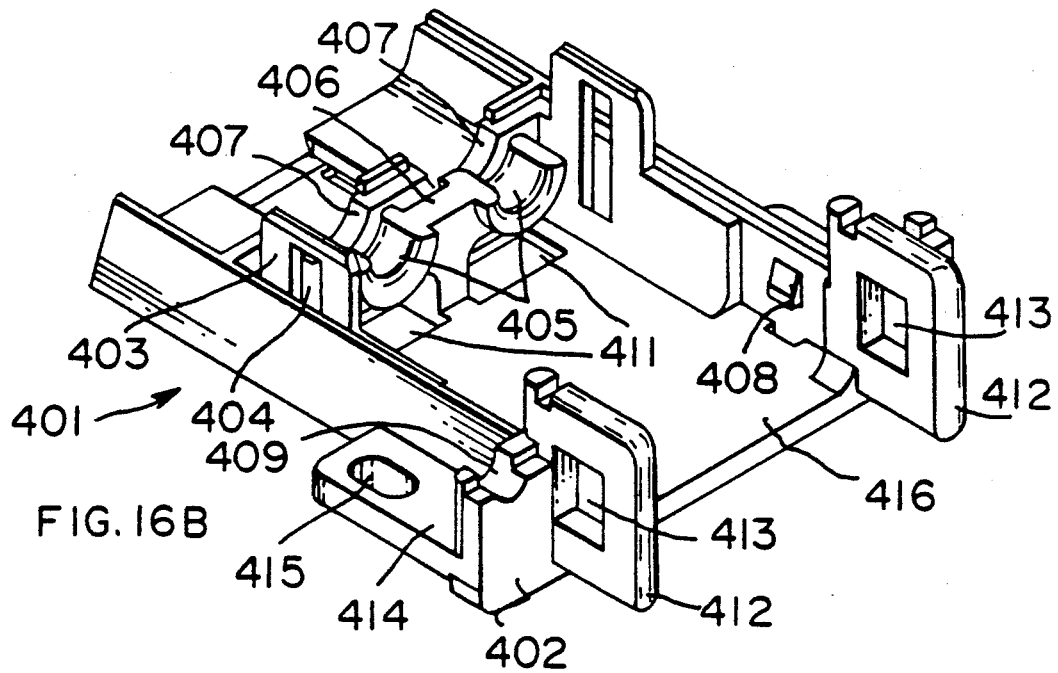
Figure 16C:
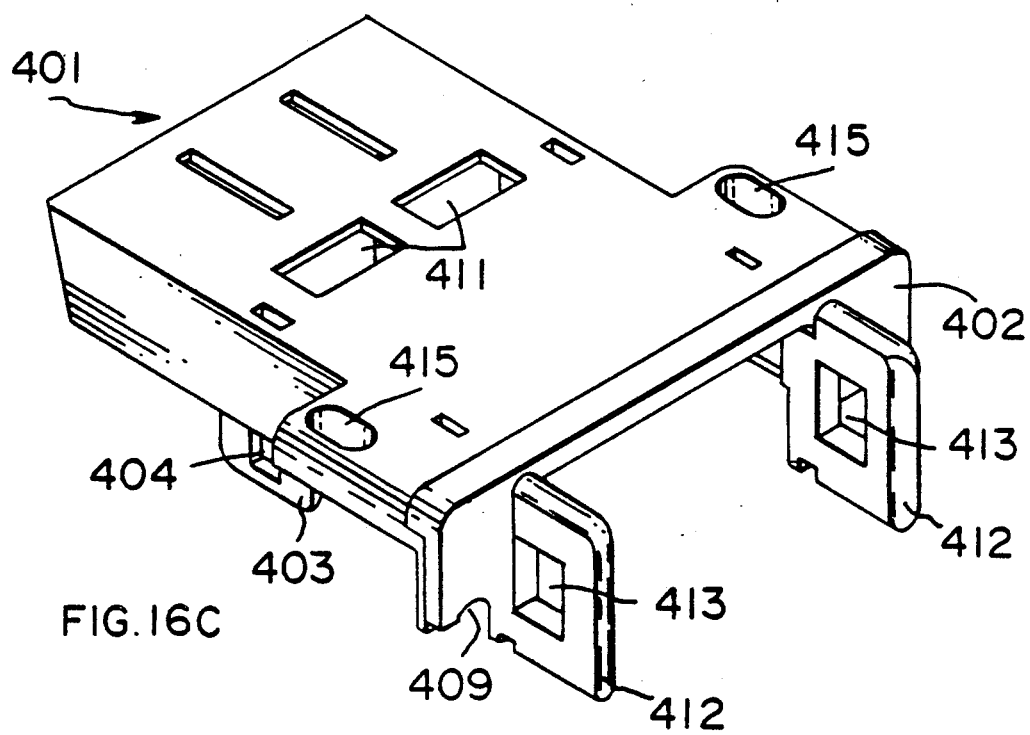

Tailgate 400 will serve as a panel or circuit board mounted interconnect member to receive a duplex connector from one side into cavity 416 as seen in FIGS. 16A and 16B. This would be the side most readily accessible by a user outside of the panel. On the other side of the same panel or circuit board, interconnect housing 400 has a second cavity 417, as seen in FIGS. 16A and 16B, wherein are received two simplex connectors each carrying a single fiber optic cable for connection with fiber optic cables carried by the duplex connector inserted into first cavity 416. The two interconnecting housing halves 401 and 451 are each provided with interconnecting latches and correspondingly spaced lugs. Thus the bottom half 401 has latches 403 provided with apertures 404, and the top half 451 is provided with latches 453 containing apertures 454 as seen in FIGS. 17A and 17B.

When the top and bottom halves 451 and 401, respectively, are pressed together, latch 453 engages internal lug 408 and, correspondingly, latch 403 engages internal lug 458. The two halves are thus firmly attached to each other and provide cavities 416 and 417 for the reception of fiber optic connectors inserted from either side. Both the bottom half 401 and top half 451 are provided with structure between said first and second cavities shaped to receive and support two ferrule aligning bushings, such as either 280 or 291 (see FIGS. 14A-14C and 15A-15C) which have exterior profiles of the toadstool shape. As shown in FIGS. 16A and 16B, the bottom half 401 of tailgate housing 400 has two semi-cylindrical portions 405 of toadstool cross-section to provide half the needed support for the ferrule aligning bushings. Likewise, as seen in FIGS. 17A and 17B, the top half 451 is provided with similarly located and identically sized and shaped semi-cylindrical portions 455 to provide the needed second half of the support for the ferrule aligning bushings. The bottom half has a mating surface 406 separating the two toadstool shaped portions 405, and top half 451 has a mating face 456 separating corresponding toadstool support portions 455 respectively. When the top and bottom halves, 451 and 401, are pressed together, these two mating surfaces lie on a common plane. Between the toadstool shaped support 405 and the entrance to the second cavity, in the bottom half 401, there is a wall carrying two adjacent semi-cylindrical profiles 407 to guide the ferrules of the simplex connectors to be inserted into the second cavity. There are corresponding and matchingly located semi-cylindrical profiles 457 in the top half as best seen in FIGS. 17A and 17B.

As best seen in FIG. 16A, bottom half 401 in the central portion of the bottom surface of the second cavity is provided with a shaped recess 410 to receive a carrier (to be more fully described below) that will support two simplex connectors side-by-side for easy insertion and removal within the tailgate housing 400. Bottom half 401 also is provided with two forwardly directed ears 412, each of which is provided preferably with a rectangularly shaped and generally centrally located aperture 413. At right angles to ears 412 and on either side thereof is a partial flange 402. On the other side of flange 402, away from ear 412, on either side of the bottom half is another flat flange 414 provided with an oblong aperture 415. When the two housing halves 401 and 451 are pressed together, therefore, there is created a PCB mounted tailgate interconnect housing with both holes 409 on the outside of ears 412 as well as two horizontally aligned flanges 414 for mounting to the panel circuit board as needed.

Top half 451 is provided with a longitudinally aligned ridge 460 to serve as a keyway for a notch in the duplex connector to be inserted therein. This ridge may be located centrally with respect to the first cavity or may be displaced to the side, as appropriate. Note the centrally located aperture 462 (best seen in FIGS. 17A and 17C) adjacent the end at which the two simplex connectors are to be inserted, preferably supported by a simplex carrier (discussed below) which latches into aperture 462 for positive holding thereat. For use, therefore, two ferrule-aligning bushings, such as 280 or 291 as desired, are placed onto support portion 405 of the bottom half, and the top half 451 is pressed on thereto. The sizing of support portions 405 and 455, together with the semicylindrical portions 407 and 457, respectively, will now ensure that the simplex cables which have ferrules at the ends will enter the bushings on one side while corresponding ferrule ends of a duplex connector will enter from the other side of the bushings. When the ferrule ends are inserted into these bushing, they are firmly aligned with respect to each other while the bushing remains supported with a certain degree of flexibility to move as needed to compensate for any molding imperfections. The assembled tailgate may be inserted through a suitably sized opening in the panel and bolted thereto by bolts inserted through the completed flange comprised of sections 402 and 452. A duplex carrier is preferably inserted from the outside of the circuit panel and a pair of simplex cables may be inserted from the other side of the tailgate housing to couple therewith. Longitudinal ridge 460 formed on the inside of the top half 451 matches in position, shape and size a keyway on one side of the duplex connector This ensures that the duplex connector can be inserted in only one way, thus ensuring correct polarity at the interconnection. This ridge 460 does not necessarily have to be located centrally with respect to the tailgate top half.

Other embodiments of the wall mounted tailgate structure are shown in FIGS. 18A, 18B, 19A, 19B, 20A, and 20B.

Figure 18A:
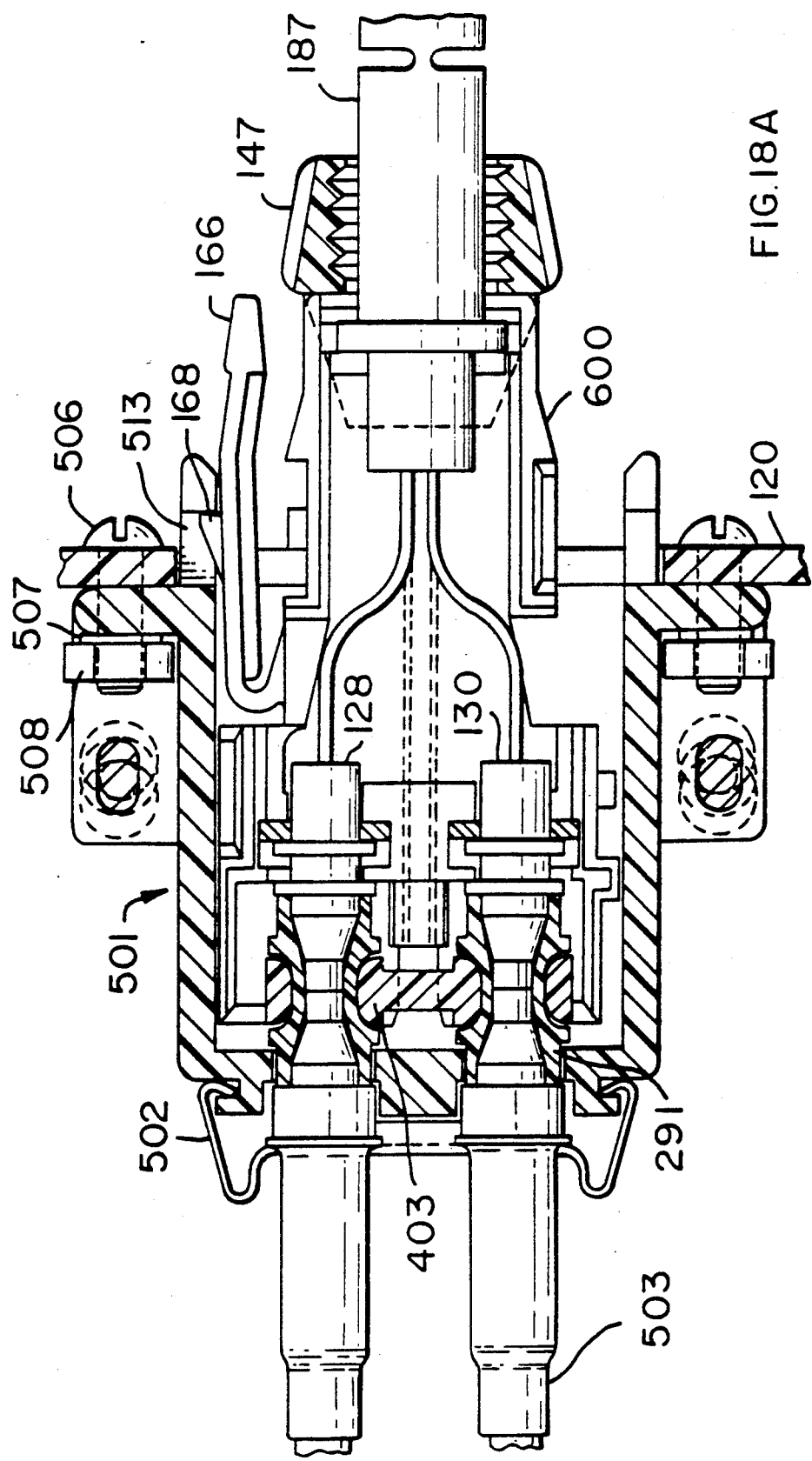

Thus FIGS. 18A and 18B show a tailgate assembly generally similar to that provided by combining the top and bottom halves of the PCB mounted tailgate shown in FIGS. 16A-16C and 17A-17C. The principal difference between the tailgate mounting shown in FIGS. 18A and 18B and the one that would result from combining the elements shown in FIGS. 16A-16C and 17A-17C is in the rear end thereof. Thus, for wall mounted tailgate 501 of FIGS. 18A and 18B the end at which simplex connectors are located is shaped to receive a clip 502 which positively engages to the tailgate housing 501 a simplex connector having a ferrule end 174 and an engagement sheath 503. Two such simplex connectors are so connected at one end of the tailgate housing. A duplex connector 600 is inserted from the outside end of the tailgate housing 501 in such a manner that lug 168 engages aperture 513 of the ears of the tailgate housing that stick out outside the printed circuit board or wall 120. Bolts 506, washers 507, and nuts 508 are utilized to mount the tailgate to the wall 120. Ferrules 128 and 130 terminate the two optic fibers of duplex connector 600. The two simplex cable terminations at ferrules 174 are in principle similar, and each is inserted through one end of, preferably, ferrule aligning bushing 291 supported by the toadstool shaped support 403. Ferrules 128 and 130 are inserted from the opposite ends of bushings 291 to be aligned with and interconnected with the simplex connector ferrules 174. FIG. 18B indicates further the use of a clip 504 to ensure retention of the simplex connectors in place at the end of tailgate housing 501.

Figure 19A:
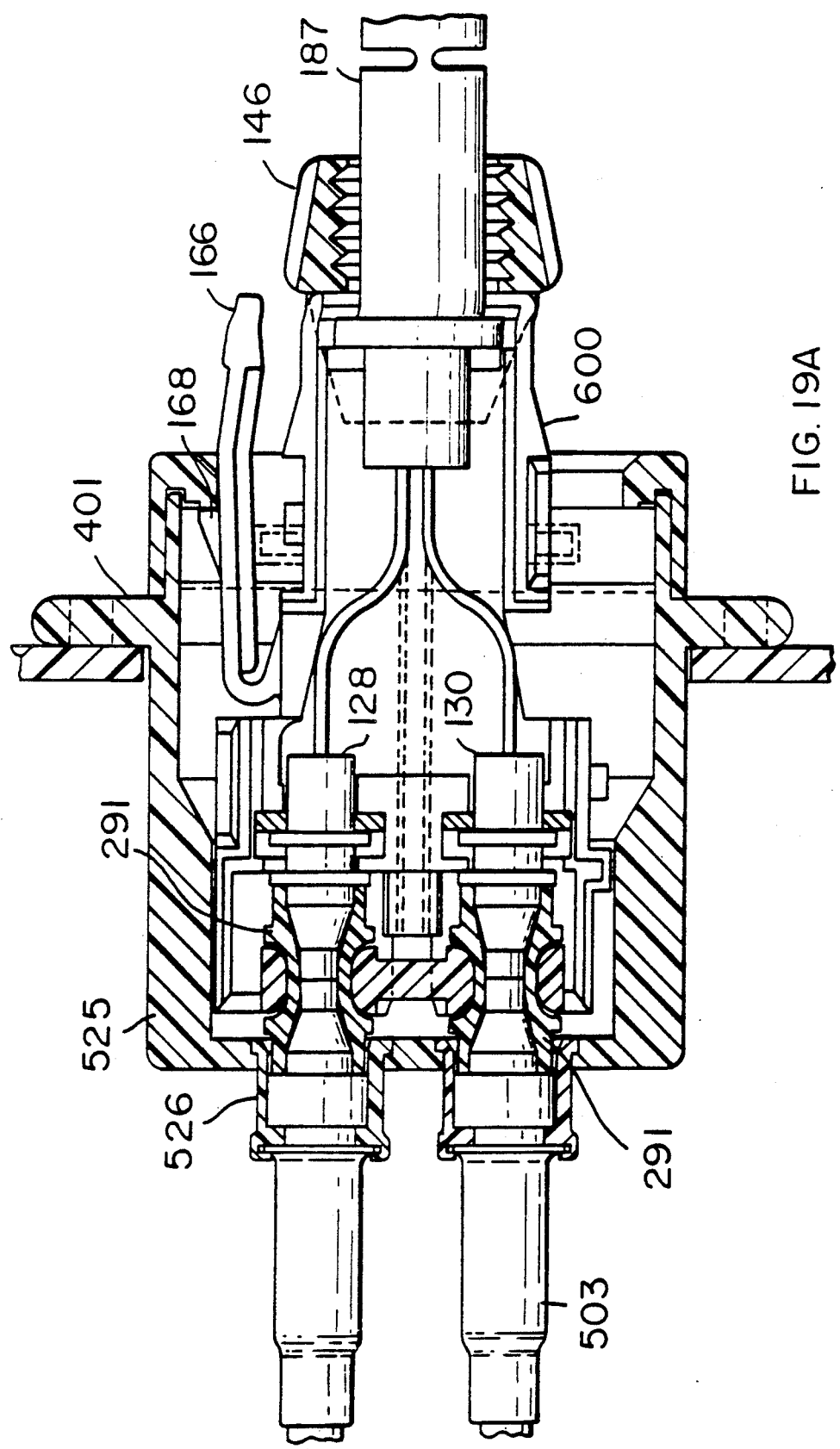
Figure 20A:
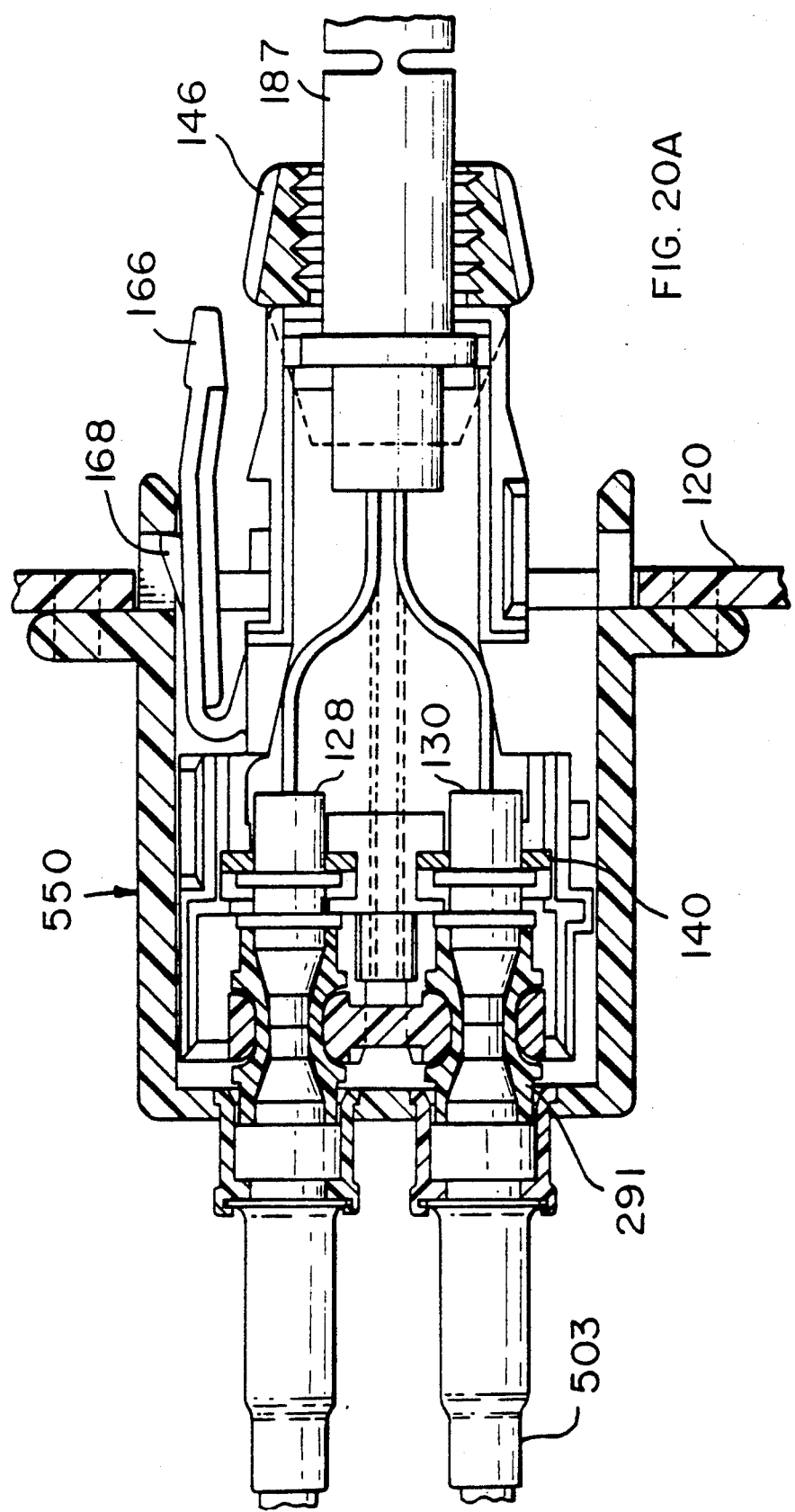

FIGS. 19A and 19B show a variation of the wall mounted tailgate housing, 525, which is mounted from the outside of wall 120 and also contains a dust and dirt excluding door 403. The general structure of the housing assembly 525 in its essentials is very similar to that depicted in greater detail in FIGS. 16A-16C and 17A-17C, with the exception of the manner in which the simplex connectors attach to the tailgate. Thus tailgate housing 525 receives simplex ferrules 174 in sheaths 526 that fit into the rear of the tailgate assembly. The tailgate assembly depicted in FIGS. 18A and 18B is generally known as a low profile tailgate assembly, as contrasted to the high profile tailgate assembly illustrated in FIGS. 19A and 19B, because much less of its structure sticks outside of the wall to which it is mounted. FIGS. 20A and 20B illustrate a low profile wall mounted assembly generally similar in its rear structure to that shown in FIGS. 19A and 19B, with the exception that the assembly shown in FIGS. 20A and 20B is mounted from the rear of wall 120.

Figure 22A:
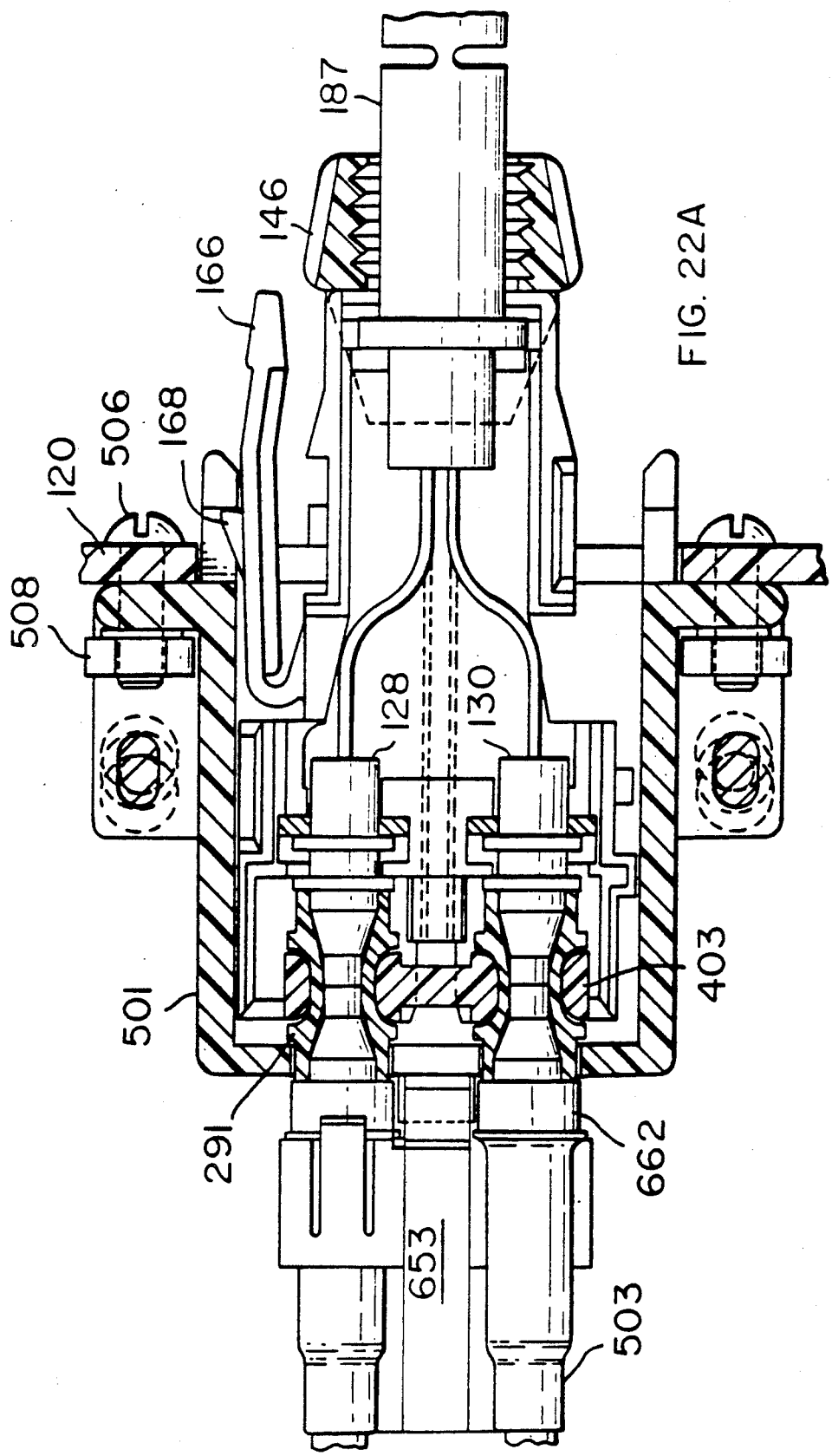

It is unusual in the design of electro-optical equipment that includes printed circuit boards to have much room behind the front panel of the equipment cabinet. Therefore, it is generally quite awkward for a user who wishes to connect or disconnect fiber optic cables to have much room to maneuver. One solution to this problem lies in providing a simplex terminal carrier such as 650 shown in FIGS. 21A-21C. Simplex terminal carrier 650 has a body on either side of which are partial cylindrically shaped clips 651 and 652 respectively. The simplex carrier 650 is also provided with a latching arm 652 that has a lug 653 at the very end. FIGS. 21A through 21C show the steps involved in utilizing such a simplex terminal carrier, as follows: in FIG. 21A are shown two simplex terminals 661 and 662 connected respectively to the ends of single optical fibers 665 and 666 and ending in ferrules 663 and 664 profiled to be inserted into ferrule aligning bushings 291; the cable terminals 661 and 662 are shown clipped into place in the carrier 650 in FIG. 21B; the entire assembly, with the simplex terminals 661 and 662 firmly clipped into place into carrier 650 may then be easily grasped by a user and inserted into the rear of a tailgate housing 690. Lug 654 latches into a suitably shaped aperture 694 and tailgate housing 690. When the simplex carrier is to be removed from engagement with the tailgate 690, the user merely presses downward on latching arm 653 to disengage lug 654 from aperture 694, whereupon the entire carrier assembly with both simplex cables clipped within may be easily pulled out from the tailgate assembly 690. FIGS. 22A and 22B show in partial section how simplex terminal carrier 650 appears in connection with the wall mounted tailgate assembly 501.

Figure 23A:
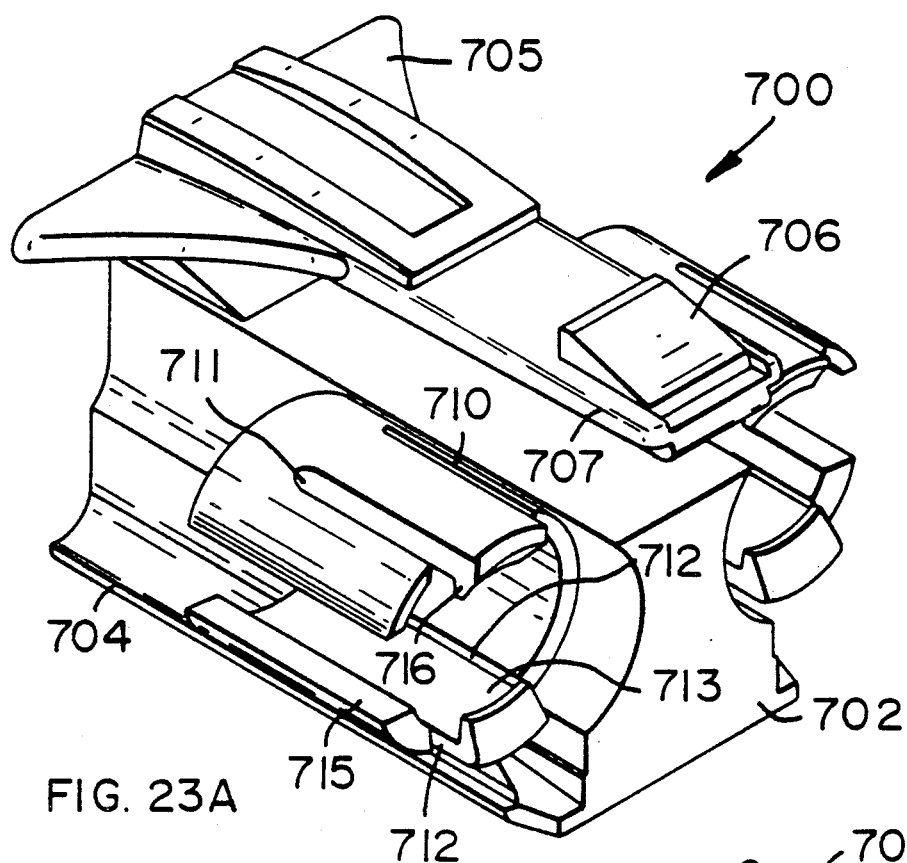
FIGS. 23A and 23B are perspective views of a second embodiment of a simplex terminal carrier.
Figure 23B:
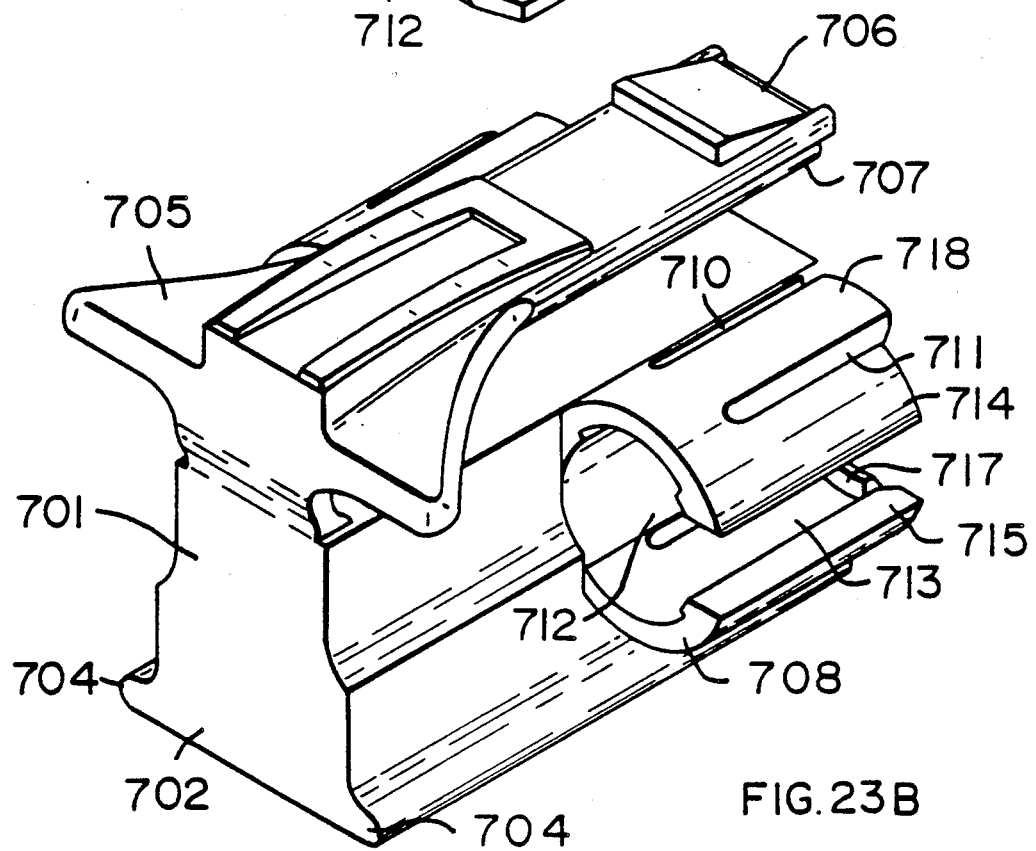

FIGS. 23A and 23B show perspective views of an alternative embodiment of a simplex terminal carrier. Such a carrier 700 has a body 701 which is provided with flat base 702 at which on either side extend flat straight flanges 703 and 704 respectively. At the top of body 701 is a latching arm 705 provided with a latching lug 706 at its distal end. On either side of body 701 is a clipping structure comprised of two parts 707 and 708, each having the general form of a partial hollow cylindrical surface. The portion 707 is provided with two partial cuts 710 and 711 which together provide it with increased flexibility. Likewise, the lower portion 708 is provided with comparable cuts 712 and 714 creating fingers 713 and 715 as best seen in FIG. 23B. The portion between cuts 710 and 711 is provided at its end with a radially inwardly directed extension 716 and, similarly, the lower portion 708 between cuts 712 and 713 is provided with a like radially inwardly directed extension 717. As best seen in FIG. 23A, extensions 716 and 717 have tapered forward ends that serve to act as ramps for a cylindrical simplex carrier pushed in from the front. When this is done, the radial flange at the forward end of each simplex terminal firmly and securely lodges immediately ahead of the ends of fingers 714 and 715 and behind extensions 716 and 715. Since these extensions 716 and 717 are somewhat forwardly displaced with respect to the ends of portions 714 and 715, there is thereby created a facility for introducing and clipping into place within each clipping arrangement, one on either side of body 701 of the simplex terminal carrier 700, a single simplex terminal ending in a ferrule suitable for insertion into a bushing such as 291 positioned on a toadstool support inside any one of the wall mounted interconnect tailgates described above. The user, therefore, may utilize simplex carrier 700 with two individual simplex cable terminals clipped into the clipping arrangements on either side for insertion into a tailgate assembly.

Figure 24A:
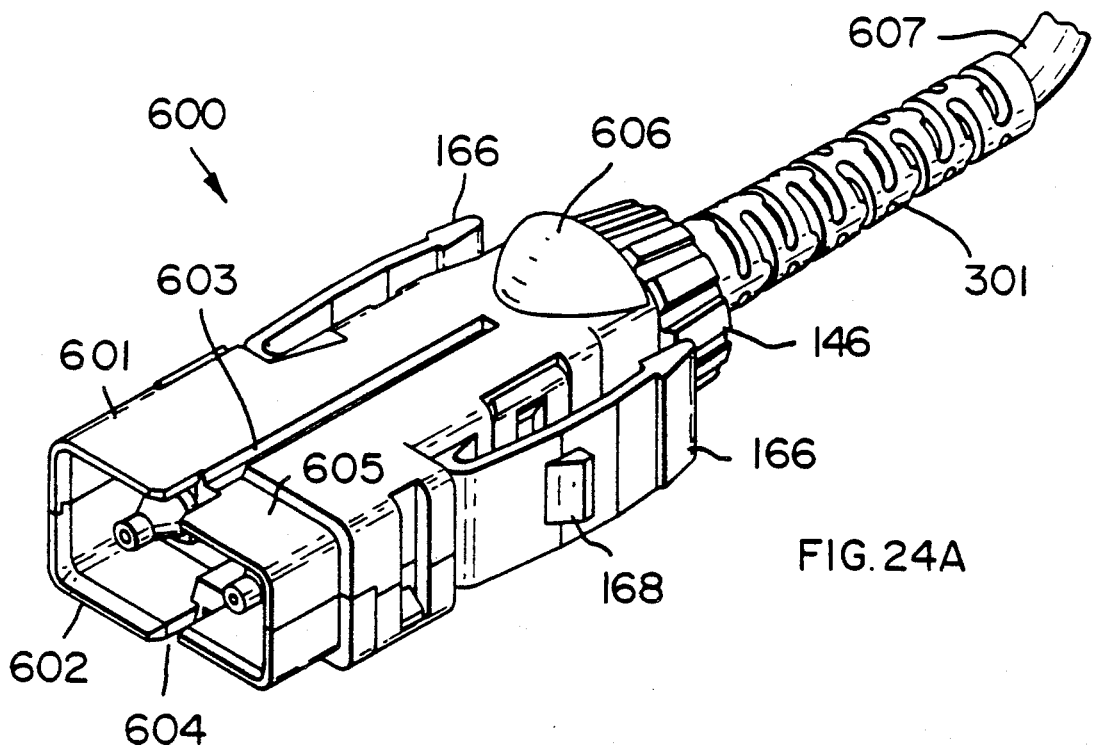
FIGS. 24A and 24B are perspective views of an embodiment of a duplex connector.
Figure 24B:
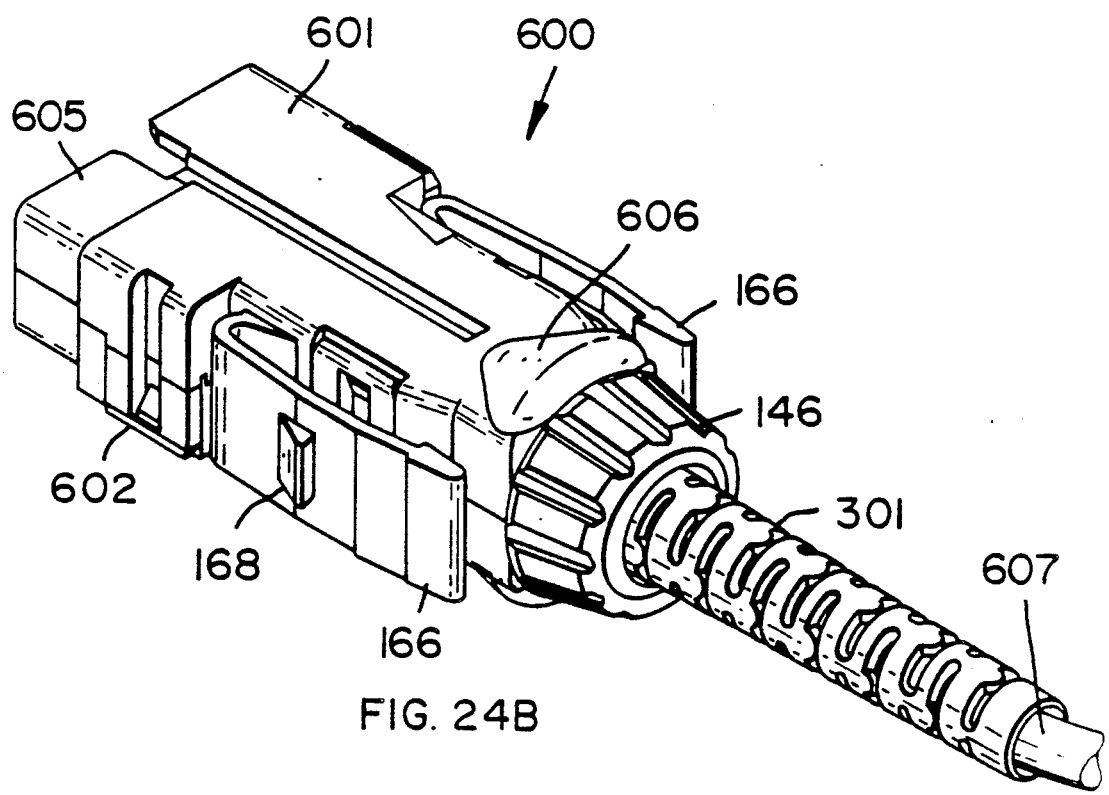

FIGS. 24A and 24B show an alternative structure for the duplex connector of which one embodiment was shown in FIG. 3. Duplex connector 600 is comprised of two hermophroditic parts that clip together with latches and lugs engaging between the two parts, generally as was described for the embodiment 112 shown in FIG. 3. Latching arms 166 with latching lugs 168, one on either side of the duplex connector, are similar to those found in duplex connector 112. Also, an alignment groove 603 is provided in both halves in this embodiment. The geometry of upper half 601 and lower half 602 is noteworthy particularly at the open end of the connector, where portions 605 are reduced on one side of the groove in each half so as to have dimensions slightly smaller than the interior dimensions of the unreduced portion thereof. The benefit of this change in geometry is to allow such a duplex connector to be used with any of the tailgate housings discussed previously to interconnect a duplex cable to one or two simplex terminals. Note also that at the end where the strain relief is connected to the duplex connector housing there is a raised externally serrated conical portion 606 which facilitates easy grasping when inserting the duplex connector into a tailgate. A particular advantage obtained by the undercutting of portion 605 with respect to the general outside shape at the open end of duplex connector 600 will be appreciated in connection with other applications discussed below.

Figure 25:
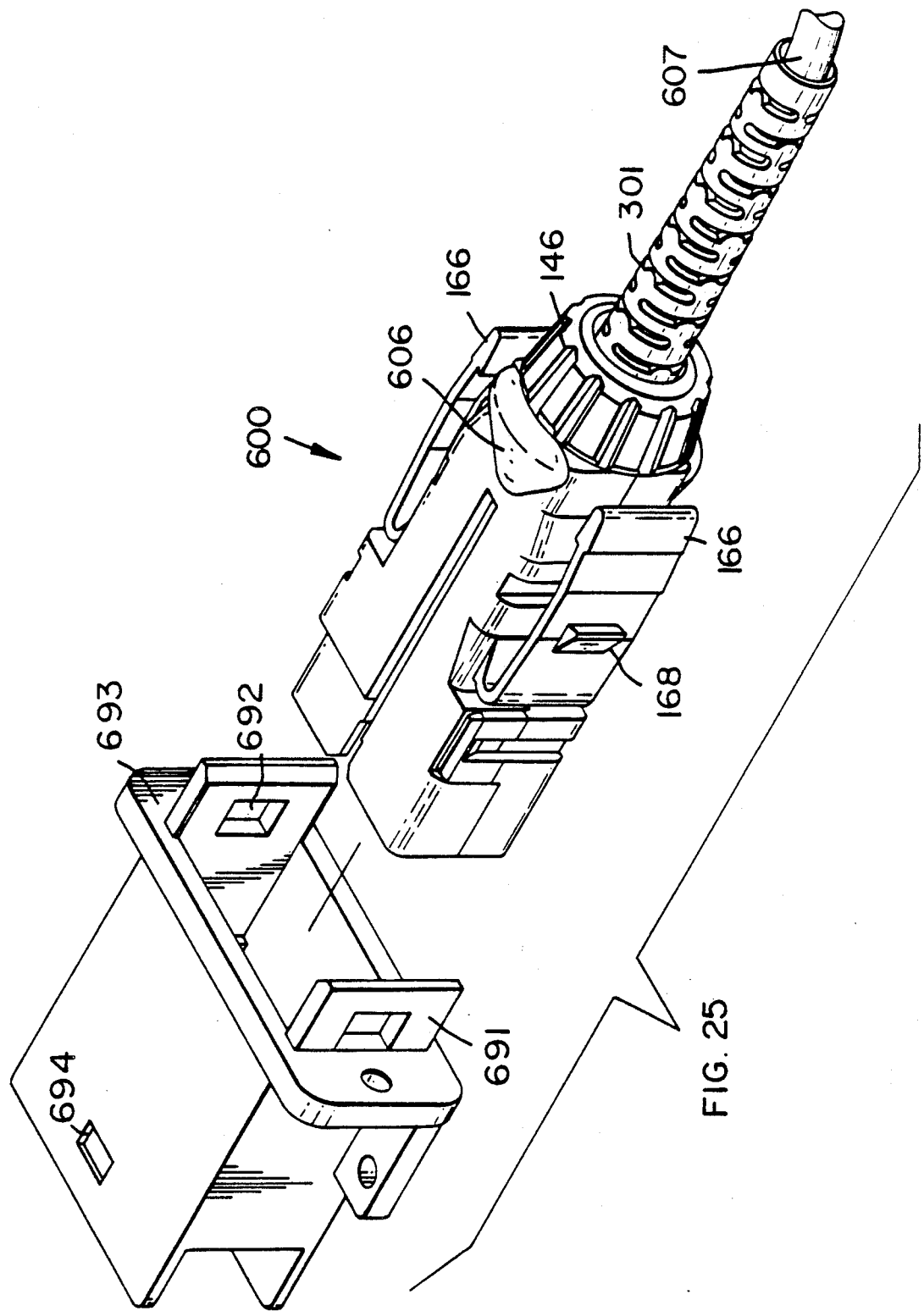
FIG. 25 illustrates the duplex connector of FIGS. 24A and 24B aligned for insertion into a tailgate housing of the type shown in FIGS. 21B and 21C.

FIG. 25 indicates how duplex connector 600 may be utilized with tailgate housing 690. Note that when duplex connector 600 is inserted past ears 691 into tailgate housing 690, latching arms 166 will bend inward until lugs 168 can latch onto apertures 692 in ears 691. For removal of the duplex connector from the tailgate housing it is therefore necessary to squeeze in latching arms 166 to disengage lugs 168 from apertures 692.

As was discussed before, it is an object of this invention to increase the facility with which fiber optic cables may be utilized in connection with electro-optical equipment. The analog to an electrical extension cord is a fiber optic extension cord ending in connectors that can be accurately aligned with other terminals bringing optical signals thereto. To facilitate such general use it is convenient to use a duplex-to-duplex coupling housing as depicted in FIGS. 26A and 26B. The housing itself may be manufactured in two symmetrical halves which are coupled together by annular members 724, very similar in geometry and purpose to annular member 224 shown in detail in FIG. 2. Each annular member 724 is provided with apertures 726 symmetrically disposed to engage lugs 714 to secure the housing halves in place together. Annular member 724 serves to retain a dust and dirt excluding door 718 which is hinged at the top end and is spring-biased in place to exclude dust and dirt by means of at least one biasing spring 722. One such dust excluding door is provided at each end. Prior to assembly of the top and bottom halves of the housing 701 and 702, respectively, two ferrule aligning bushings such as 280 or 291 are placed on the toadstool shaped support structures shown in FIGS. 26A and 26B. This locates these bushings centrally inside the housing with sufficient flexibility of movement to accommodate any molding or other imperfections that may be encountered in the various elements.

Figure 27A:
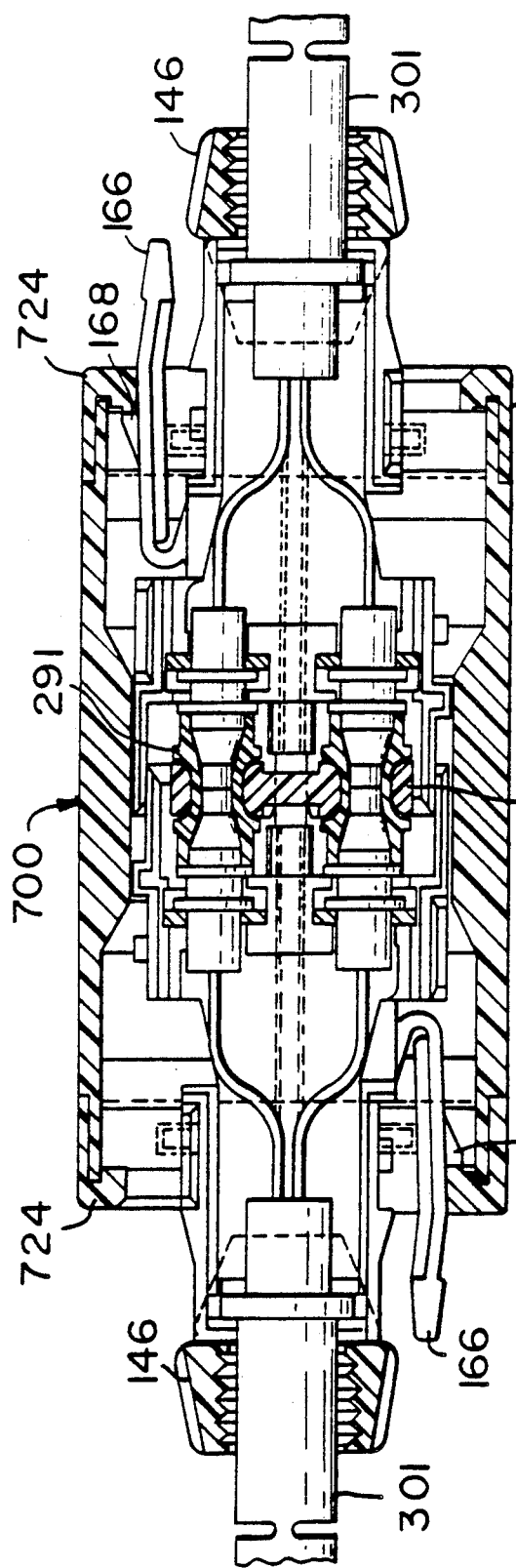
FIGS. 27A and 27B illustrate how two duplex connectors can be interconnected by the duplex-to-duplex coupling housing of FIGS. 26A and 26B.
Figure 27B:
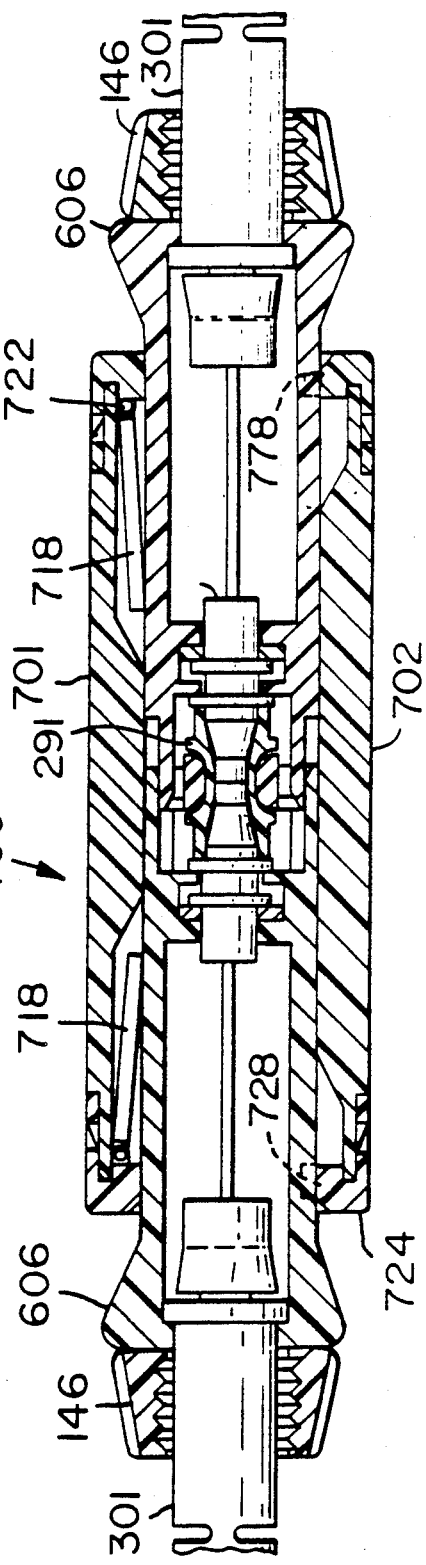

FIGS. 27A and 27B illustrate how two duplex connectors such as 600, shown in FIGS. 24A and 24B, may be inserted one from either side to move aside the dust and dirt excluding doors and to insert their respective pairs of ferrules into the ferrule aligning bushings flexibly supported within the duplex-to-duplex coupling housing 700. Either one of bushing 280 or 291 would be suitable for use in such a duplex to duplex coupling housing. Since duplex connector 600 may be used just as easily with the tailgate, e.g., 690 as shown in FIG. 25, it then becomes very convenient for a user wishing to connect two pieces of fiber optic equipment to utilize an extension fiber optic cable with two individual fibers ending in duplex connectors such as 600 at either end, to plug one end into a tailgate housing mounted on a printed circuit board wall and the other end to a duplex-to-duplex coupling housing like 700. Then, by means of yet another such extension cable, the duplex-to-duplex coupling housing may be further connected to other cables or other equipment as needed. Thus, with the use of a duplex-to-duplex coupling housing such as 700, and suitably designed duplex connectors, it becomes just as convenient to interconnect and extend the range over which fiber optic signals can be accurately transmitted as is presently the case in transmitting electrical signals with electrical extension cords, sockets, plugs and the like. Note that there are lugs 728 at the bottom part of each cavity formed at the end of the duplex-to-duplex coupling housing to ensure proper insertion of a duplex connector thereat. As may be seen by careful examination of FIGS. 27A and 27B, the two duplex-to-duplex connectors inserted into the cavities at either end of coupling housing 700 mesh where they meet because of the undercut portion 605 on one side of each. This ensures correct polarization of the signals transmitted therebetween by this interconnection.

Figure 28:
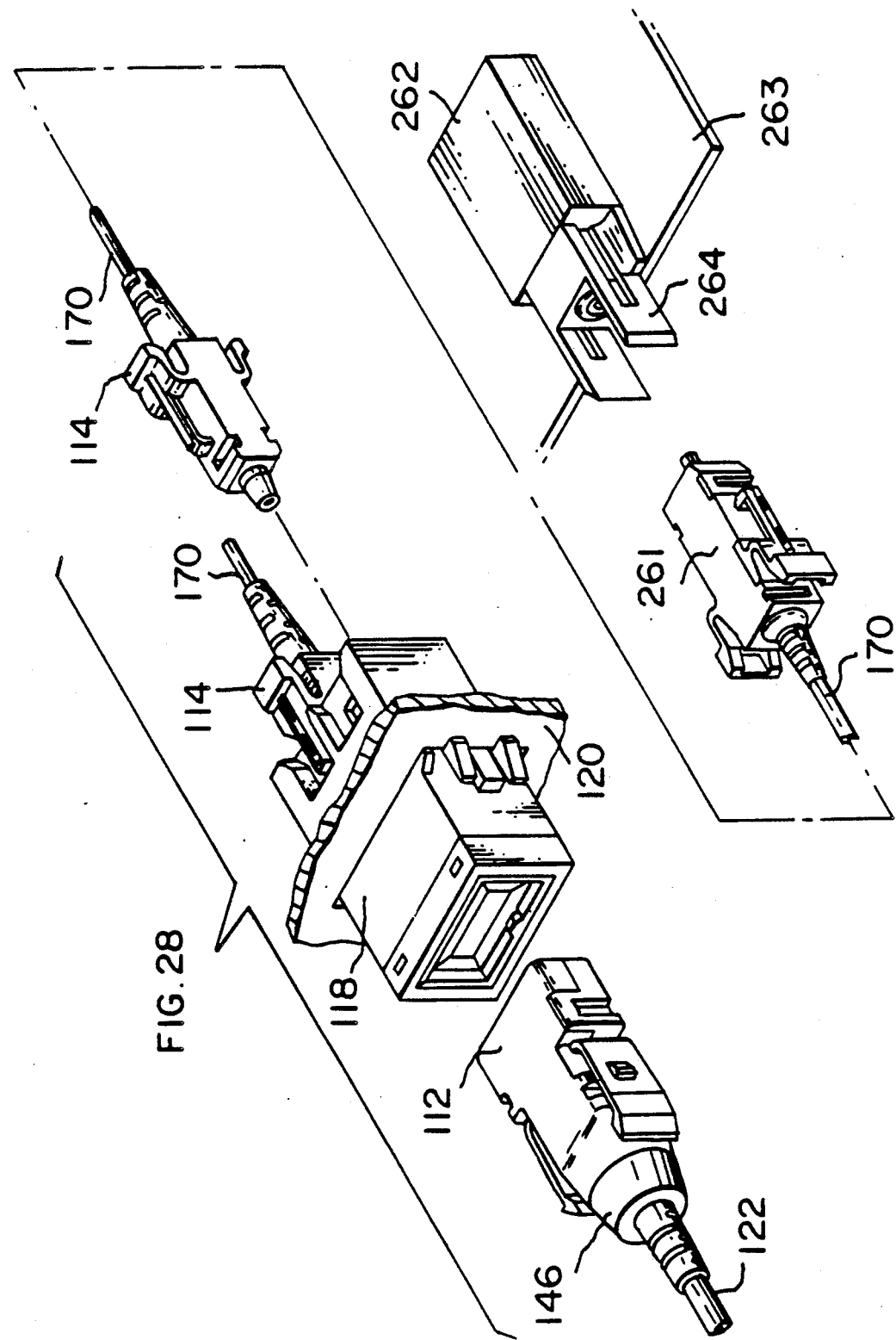
FIG. 28 illustrates how a wall mounted tailgate can be connected by a simplex cable to an active device mount portion equipment utilizing optical signals.

The same logic of an extension cable to couple different pieces of fiber optic equipment, as readily as an electrical extension cord would permit the interconnection of electrical equipment, is seen in FIG. 28. Shown in this figure is a duplex connector 112 which may be inserted into a tailgate housing 118 mounted on a wall 120, with individual simplex connectors 114 connecting a typical simplex cable 170 to receive an optical signal from one of the fibers contained in duplex connector 112. At the other end of the simplex cable 170 may be provided another simplex connector 261 which can be inserted into and connected to an electro-optic transmitter or receiver 262 shown mounted to a printed circuit board 263 and having an active device mount portion having two ears 264 between which a simplex connector may be guided to latch thereat. Thus, with extension cables such as 170 and with duplex connectors such as 600, it becomes very convenient to couple either duplex or simplex cables between various components of fiber optics equipment.

Figure 29A:
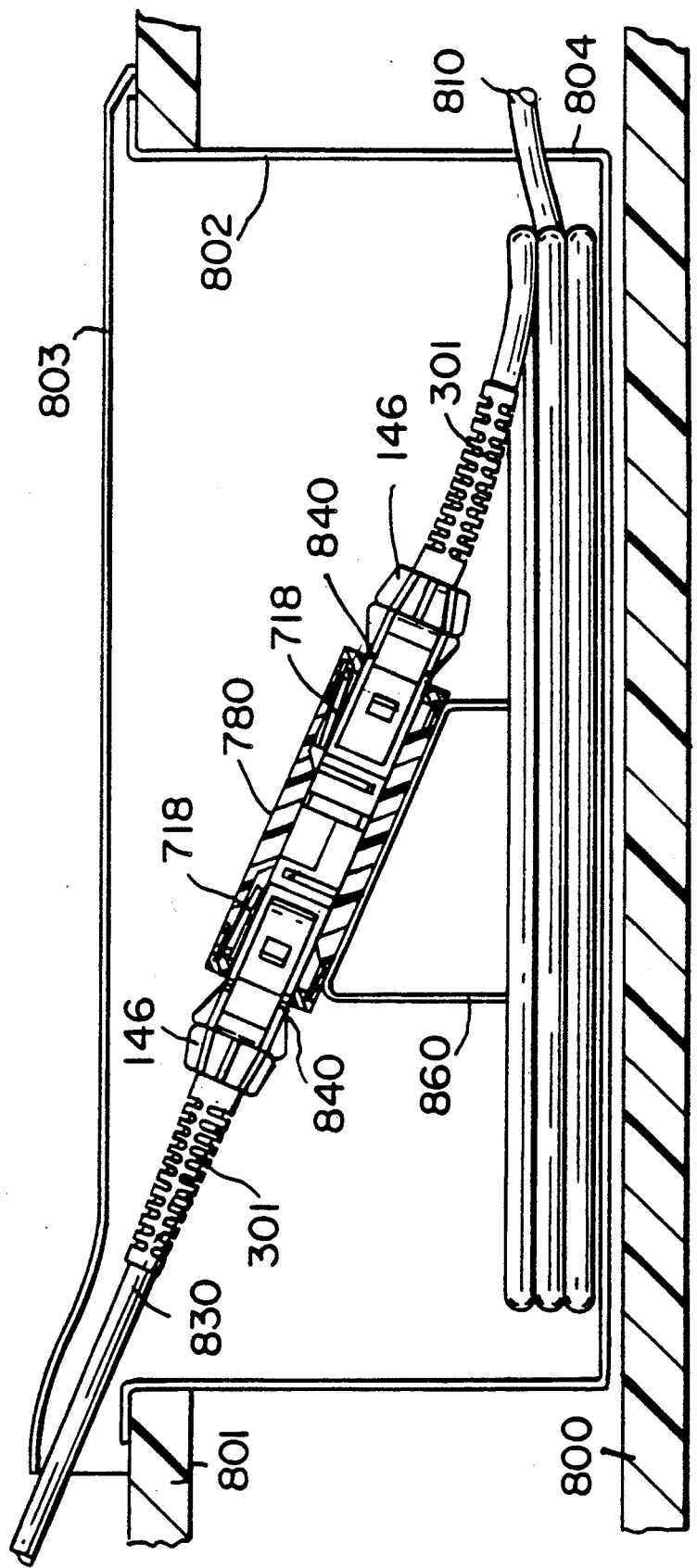
FIG. 29A is a cross-sectional view normal to both a wall and a wall box contained therein for connection with fiber optic cables bringing signals thereto.
Figure 29B:
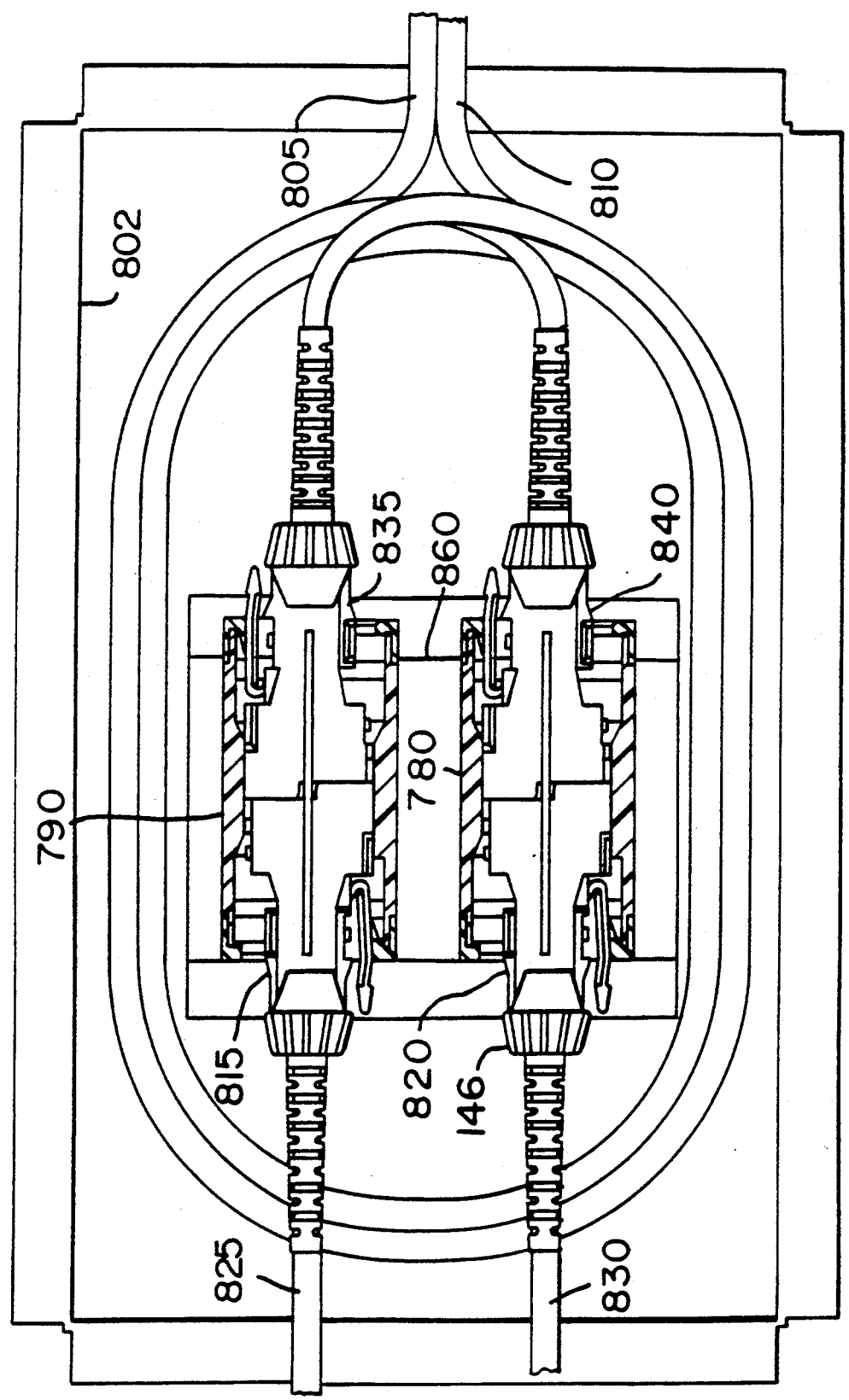
FIG. 29B is a partial section across the duplex-to-duplex coupling housings in the wall-box of FIG. 29A.

A logical and foreseeable extension of the greater utility of fiber optics communications systems, by elements such as those described above, is the provision of fiber optic signals to offices, laboratories, and homes in much the same way as electrical signals are now provided for cable television. FIGS. 29A and 29B show in partial sections a wall-box type wall-contained terminal to which fiber optics signals are brought to be interconnected and received by other equipment through the use of duplex connectors. Thus in FIG. 28A, 800 and 801 are wall boards or wall material between which is a space large enough to accommodate a wall-box 802 with a lid 803 on one side. Lid 803 may be hinged or mounted in any conventional and convenient fashion for occasional opening for access to the elements contained within box 802 but to exclude dust and dirt the rest of the time. Box 802 contains an aperture 804 through which a pair of multi-fiber fiber optic cables 805 and 810 are brought into box 802. A sufficient length of the cables is retained in a coiled fashion to allow convenient access for working on the two duplex connectors terminating the respective ends of cables 805 and 810. This extra length of cable is wound loosely around a support bracket 860 mounted generally centrally within the box 802. Two duplex-to-duplex coupling housings 780 and 790, essentially similar to 700, are mounted on bracket 860 within the box 802. At one end of each is inserted a duplex connector 800 connected to one of the cables coming through the wall to the wall-box 802. It is now possible, by lifting lid 803 out of the way, to insert an extension fiber optic cable terminated in a duplex connector into the other side of one or the other of housings 780 and 790. This wall-box terminal, therefore, essentially replicates a two point wall socket in an electrical system. By so "plugging in" fiber optics cables to the two duplex-to-duplex housings 780 and 790 within wall box 802, it becomes possible for a user to combine the resources of a central signal sending facility with fiber optic equipment that he may wish to connect thereto.

Persons skilled in the art of fiber optics equipment and its use will readily see from the above descriptions that the apparatus described in this specification covers a variety of alternative structures intended to and designed to provide versatile interconnection between fiber optic cables and fiber optic elements in a fiber optic communication system. It should be apparent from the proceeding that this invention may be practiced otherwise than as specifically described and disclosed herein. Modifications may therefore be made to the specific embodiments disclosed here without departing from the scope of this invention, and all such modifications are intended to be included within the claims appended below.

What is claimed is:

1. A fiber optic connector assembly for mating an optical fiber of a first fiber optic cable with a like optical fiber of a second fiber optic cable with maximum axial alignment of the respective mated fibers, said assembly comprising:
   a plurality of ferrules, each receiving a respective optical fiber therein;
   a connector for each cable, each connector having a housing receiving therein a ferrule attached to a fiber associated with a respective cable; and
   an interconnect member having opposed cavities receiving respective connectors, passageways interconnecting respective cavities, and receptors mounted in each passageway, with each receptor having a profiled bore receiving a ferrule in each of the opposite ends thereof and an outer profile allowing movement about the geometric center of the receptor so as to axially align the bores of the ferrules received therein.

2. A fiber optic interconnect system providing for accurate intermating of optical fibers by providing floating interconnect, said system comprising:
   an interconnect device defining first and second oppositely directed cavities with at least one passage extending between respective pairs of cavities, each said passage being profiled with an inwardly directed annular flange at a first end and a threaded portion at the opposite end;
   a threaded nut received in said threaded portion; and
   a receptor received in each said passage and held therein by said threaded nut and said annular flange, said receptor having an outer profile allowing movement about the geometric center of said receptor and having a profiled through-bore receiving nose portions of ferrules of respective fiber optic connectors therein, whereby movement of said receptor causes said ferrules to become axially aligned for maximum light transfer between said intermated optical fibers.

3. A fiber optic connector for a fiber optic cable, comprising:
   a duplex connector with a cable entry and with a mating end adapted for mating said duplex connector with another said duplex connector of similar construction,
   said mating end having on one side an outside shape with a reduced dimension portion, and having another side an unreduced dimension portion, and
   each optical fiber of at least one fiber optic cable extending in said cable entry being terminated by a corresponding ferrule, each said ferrule being positioned by said duplex connector with an end of said ferrule toward said mating end.

4. A ferrule-aligning receptor, comprising:
   a generally cylindrical shape with a through-bore profiled at opposite ends to receive nose portions of respective ferrules therein, and having an outer profile comprising a symmetrical central portion formed of arcuate segments to approximate a toadstool cross-section shape allowing movement of said receptor about its geometric center while being supported on the outside, to thereby compensate for misalignment or minor defects of said ferrules and bring them into substantially axial alignment, said central portion being bounded on either side by an annular flange and supported around the toadstood profile with a small amount of play.

5. A simplex fiber optic terminal carrier for carrying at least two simplex terminals for interconnection of fiber optic cables, comprising: a body on a substantially flat base;
   attached to said body, preferably at the top, a forwardly extending cantilevered latching arm provided with a forwardly tapered lug at its distal end;
   attached to two opposite sides of said body, spring clip means for firmly clipping therein simplex fiber optic cable terminals terminating optical fiber ends in resiliently, forwardly directed individual ferrules.

6. A fiber optic cable connector for a fiber optic cable containing an optical fiber, comprising:
   two mating housing halves, each of which is provided with interlocking latch and lug means for interlocking with the other half to constitute a connector housing, said interlocked housing halves having external portions at their respective first ends to jointly provide an external thread thereat, and further cooperating to provide an opening of said connector housing at their opposite ends;
   a strain relief firmly attached to a first end and said fiber optic cable, said strain relief having one end shaped and sized to be grasped by said interlocked housing halves within said externally threaded portions thereof;
   an internally threaded nut threaded onto said external threaded portions of said interlocked housing halves to positively retain said strain relief therein;
   a ferrule terminating said optical fiber, shaped and sized to be grasped firmly inside said interlocked housing halves such that the terminal end of said ferrule terminating the fiber within is directed forwardly and positioned within said opening of said connector;
   said housing halves each having a straight longitudinal groove on an exterior surface, said groove having an open end at the rim of said opening of said connector, and said exterior surface of each of said housing halves being reduced in dimensions on one side of said groove so as to be slightly smaller than the interior of the unreduced portion on the other side of said groove.

7. A fiber optic interconnect member for mating an optical fiber of a first fiber optic cable with a like optical fiber of a second fiber optic cable, with each mating cable ending in a cable connector, comprising:
   a housing having opposed cavities for receiving respective cable connectors with passageways interconnecting respective cavities;
   each of said connectors having a mating end adapted for mating with the other of said connectors, said mating end having on one side an outside shape with a reduced dimension portion, and having on another side an unreduced dimension portion; and
   ferrule-aligning receptors mounted in each passageway, with each such receptor having a profiled bore for receiving a fiber-terminating ferrule of said respective connectors into each of its two ends for thereby interconnecting optical fibers of said respective connectors by pairs.

8. A fiber optic interconnect member according to claim 7, further comprising;
spring biased doors at each end for excluding dirt and dust from said cavities, each of said doors pivotally hinging out of the way when a connector is applied thereto, for the connector to be received within the respective cavity.

9. A fiber optic interconnector member according to claim 7, wherein:
said interconnect member is permanently mounted and receives a cable connector ending a fixed fiber optic cable carrying optical signals.

10. A fiber optic interconnect member according to claim 7, wherein:
said interconnect member is mounted inside a wall box.

11. A fiber optic connector for a fiber optic cable, comprising:
a duplex connector with a cable entry and with a mating end adapted for mating with another said duplex connector of similar construction,
an outside shape of said mating end having a reduced dimension portion on one side of at least one groove, and having an unreduced dimension portion on the other side of said groove, said groove extending from said mating end toward the cable entry, and
each optical fiber of at least one fiber optic cable extending in said cable entry being terminated by a corresponding ferrule, each said ferrule being positioned by said duplex connector with an end of said ferrule toward said mating end.

12. A fiber optic connector as recited in claim 11 wherein, the reduced dimension portion is slightly smaller than an interior of the unreduced dimension portion.

13. A fiber optic connector as recited in claim 11 and further comprising: latching means on said duplex connector for latching releasably to an interconnect member receiving said duplex connector.

14. A fiber optic connector as recited in claim 13 wherein, said latching means includes, pivotal latching arms adapted for receipt by the interconnect member, said latching arms being adapted to be grasped and pivoted inwardly to permit removal of said duplex connector from the interconnect member.

15. A fiber optic connector as recited in claim 11, and further comprising: multiple cover members fitted together to form said duplex connector, and each said ferrule is received in one of multiple passages of said duplex connector formed by said fitted together cover members.

16. A fiber optic connector as recited in claim 11, and further comprising: resilient means mounted on each of said ferrules and received in profiled passages of said duplex connector for establishing a floating mount of said ferrules.

17. A fiber optic connector as recited in claim 11, and further comprising: a strain relief attached to said cable.

18. A fiber optic connector for a fiber optic cable, comprising:
a duplex connector with a cable entry and with a mating end adapted for mating said duplex connector with another said duplex connector of similar construction,
each optical fiber of at least one fiber optic cable extending in said cable entry being terminated by a corresponding ferrule, each said ferrule being positioned by said duplex connector with an end of said ferrule toward said mating end,
a strain relief receiving cable, and
a threaded nut received over said strain relief and received over threads on the cable entry.

19. A fiber optic connector as recited in claim 18 wherein, the cable entry is formed by multiple cover members fitted together.

20. A fiber optic connector as recited in claim 18 wherein, the cable entry and said mating end are formed by multiple cover members fitted together.

21. A fiber optic connector as recited in claim 18 and further comprising: latching means on said duplex connector for latching releasably to an interconnect member receiving said duplex connector.

22. A fiber optic connector as recited in claim 21 wherein, said latching means includes, pivotal latching arms adapted for receipt by the interconnect member, said latching arms being adapted to be grasped and pivoted inwardly to permit removal of said duplex connector from the interconnect member.

23. A fiber optic connector as recited in claim 18, and further comprising: multiple cover members fitted together to form said duplex connector, and each said ferrule is received in one of multiple passages of said duplex connector formed by said fitted together cover members.

24. A fiber optic connector as recited in claim 18, and further comprising: resilient means mounted on each of said ferrules and received in profiled passages of said duplex connector for establishing a floating mount of said ferrules.

* * * * *